US007110859B2

(12) United States Patent
Shibata et al.

(10) Patent No.: US 7,110,859 B2
(45) Date of Patent: Sep. 19, 2006

(54) SETTING METHOD AND SETTING APPARATUS FOR OPERATION PATH FOR ARTICULATED ROBOT

(75) Inventors: Kaoru Shibata, Utsunomiya (JP); Ryo Nakajima, Tochigi-ken (JP); Masakatsu Kaneko, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 139 days.

(21) Appl. No.: 10/468,365

(22) PCT Filed: Nov. 22, 2001

(86) PCT No.: PCT/JP01/10202

§ 371 (c)(1),
(2), (4) Date: Aug. 19, 2003

(87) PCT Pub. No.: WO02/066209

PCT Pub. Date: Aug. 29, 2002

(65) Prior Publication Data

US 2004/0138779 A1 Jul. 15, 2004

(30) Foreign Application Priority Data

Feb. 19, 2001 (JP) .............................. 2001-042500

(51) Int. Cl.
*G06F 19/00* (2006.01)
(52) U.S. Cl. .................. 700/245; 700/255; 700/258; 700/259; 318/568.1; 318/568.11; 318/568.13; 901/1; 901/2; 901/14; 901/16
(58) Field of Classification Search ................ 700/255, 700/258–259, 245, 252, 189, 193; 318/568.1, 318/568.11, 568.13, 568.16, 577, 573–574; 901/1–2, 14, 16, 42, 46–47; 701/301; 219/124.31
See application file for complete search history.

(56) References Cited

U.S. PATENT DOCUMENTS 4,278,920 A * 7/1981 Ruoff, Jr. ........................ 318/2
4,538,233 A * 8/1985 Resnick et al. ............. 700/252
4,642,752 A * 2/1987 Debarbieri et al. ......... 700/160

(Continued)

FOREIGN PATENT DOCUMENTS

EP       000543236 A2 *  5/1993

(Continued)

OTHER PUBLICATIONS

Nakamura et al., Development of off-line programming for sopt welding robot, 1993, IEEE, p. 223-228.*

(Continued)

*Primary Examiner*—Thomas G. Black
*Assistant Examiner*—McDieunel Marc
(74) *Attorney, Agent, or Firm*—Birch, Stewart, Kolasch & Birch, LLP

(57) ABSTRACT

A temporary operation path is set by connecting a plurality of welding points in a virtual space generated by a computer to investigate whether an end effector can be operated along the temporary operation path. If the operation cannot be operated, a path to avoid interference with a workpiece is set automatically while extracting a portion in which the workpiece exists in the internal space surrounded by the end effector in order to set a narrow-area operation path for withdrawing the end effector from a welding point. Next, in order to set a wide-area operation path for making movement between withdrawing points, a template operation is applied, in which the end effector is moved by a prescribed distance in a prescribed direction.

19 Claims, 21 Drawing Sheets

U.S. PATENT DOCUMENTS

| | | | |
|---|---|---|---|
| 4,843,287 A * | 6/1989 | Taft | 318/568.16 |
| 4,922,430 A | 5/1990 | Wavish | |
| 4,952,772 A * | 8/1990 | Zana | 219/124.34 |
| 4,965,499 A * | 10/1990 | Taft et al. | 318/568.11 |
| 5,056,031 A | 10/1991 | Nakano et al. | |
| 5,073,692 A * | 12/1991 | Jackson et al. | 219/86.8 |
| 5,471,395 A * | 11/1995 | Brien | 700/186 |
| 5,513,299 A | 4/1996 | Terasaki et al. | |
| 5,530,791 A | 6/1996 | Okabayashi | |
| 5,604,677 A * | 2/1997 | Brien | 700/186 |
| 5,887,122 A * | 3/1999 | Terawaki et al. | 700/258 |
| 5,889,926 A | 3/1999 | Bourne et al. | |
| 6,040,554 A * | 3/2000 | Terada et al. | 219/124.34 |
| 6,374,158 B1 * | 4/2002 | Fusaro, Jr. | 700/254 |

FOREIGN PATENT DOCUMENTS

| | | | |
|---|---|---|---|
| JP | 07-121221 | | 5/1995 |
| JP | 08-108383 | | 4/1996 |
| JP | 9-81228 | A | 3/1997 |
| JP | 9-212225 | A | 8/1997 |
| JP | 2875498 | B2 | 1/1999 |
| JP | 3083706 | B2 | 6/2000 |

OTHER PUBLICATIONS

Dr. Ribeiro et al., Making components with controlled metal deposition, 1997, IEEE, p. 831-835.*

Cook et al., Multiple-robot programming for coordinated motion, end-effector calibration, and part localization, 1990, IEEE, p. 1669-1674.*

Jouaneth et al., Trajectory planning for coordinated motion of a robot adn positioning table: Part 1—Path sepcification, 1990, IEEE, p. 735-745.*

Kim et al., A robust method for vision-based seam tracking in robotic arc welding, 1995, IEEE, p. 363-368.*

Patent Abstracts of Japan, vol. 1997, No. 07, Jul. 31, 1997 & JP 09 081228 A, Mar. 28, 1997 abstract, col. 2, line 2-col. 7, line 34.

* cited by examiner

FIG. 10

| ORDER | NUMBER | DIRECTION OF GUN UNIT | | | POSITION OF TCP | | | ANGLE OF EACH AXIS | | | | | |
|---|---|---|---|---|---|---|---|---|---|---|---|---|---|
| | | Xr | Yr | Zr | X | Y | Z | θ1 | θ2 | θ3 | θ4 | θ5 | θ6 |
| 1 | T0 | Xr0 | Yr0 | Zr0 | X0 | Y0 | Z0 | θq10 | θq20 | θq30 | θq40 | θq50 | θq60 |
| 2 | U1 | Xr1 | Yr1 | Zr1 | X1 | Y1 | Z1 | θq11 | θq21 | θq31 | θq41 | θq51 | θq61 |
| 3 | U2 | Xr2 | Yr2 | Zr2 | X2 | Y2 | Z2 | θq12 | θq22 | θq32 | θq42 | θq52 | θq62 |
| 4 | U3 | Xr3 | Yr3 | Zr3 | X3 | Y3 | Z3 | θq13 | θq23 | θq33 | θq43 | θq53 | θq63 |
| 5 | Ue (P1) | Xr4 | Yr4 | Zr4 | X4 | Y4 | Z4 | θq14 | θq24 | θq34 | θq44 | θq54 | θq64 |
| 6 | Q1 | Xr5 | Yr5 | Zr5 | X5 | Y5 | Z5 | θq15 | θq25 | θq35 | θq45 | θq55 | θq65 |
| 7 | R1 | Xr | | | | | | | | | | | |
| 8 | ... | ... | ... | ... | ... | ... | ... | ... | ... | ... | ... | ... | ... |
| 9 | T1 | Xrn | Yrn | Zrn | Xn | Yn | Zn | θq1n | θq2n | θq3n | θq4n | θq5n | θq6n |
| 10 | | | | | | | | | | | | | |

120a 120b 120c 120

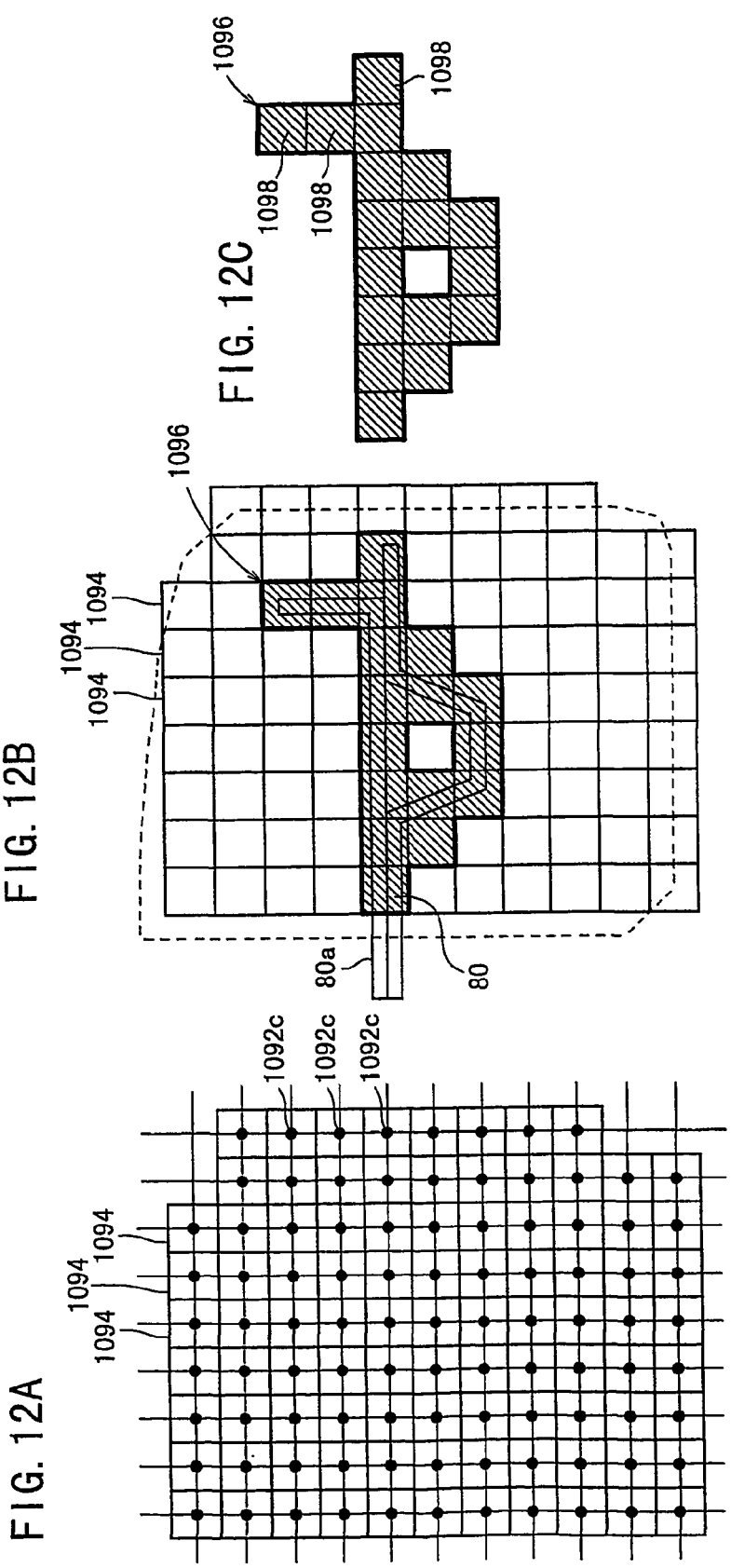

SETTING METHOD AND SETTING APPARATUS FOR OPERATION PATH FOR ARTICULATED ROBOT

This application is the national phase under 35 U.S.C. § 371 of PCT International Application No. PCT/JP01/10202 which has an International filing date of Nov. 22, 2001, which designated the United States of America.

1. Technical Field

The present invention relates to a setting method and a setting apparatus for an operation path for an articulated robot. Specifically, the present invention relates to a setting method and a setting apparatus for an operation path for an articulated robot, for setting the path for operating an end effector provided at a forward end of the articulated robot, between predetermined operation points.

2. Background Art

Conventionally, if an articulated robot installed for a production line is directly operated to perform the teaching of the operation posture, an operator skilled in the operation of the articulated robot should perform the operation at the working site of the production line. Accordingly, the operation becomes inefficient. The above operation should also be performed with the production line being stopped. Therefore, the operation rate of the production line is decreased.

Recently, the teaching (off-line teaching) is performed based upon an off-line procedure to efficiently perform the teaching operation or to maintain the operation rate of the production line. In the off-line teaching, a model, which includes an articulated robot, a workpiece as an operation objective, and peripheral structures, is constructed on a computer. Teaching data is prepared by using the model, and then the teaching data is supplied to the articulated robot installed at the working site. Therefore, it is unnecessary to stop the production line during the preparation of the teaching data.

The conventional off-line teaching is not necessarily used widely for the following reason.

Naturally, the articulated robot should not interfere with (for example, contact) various peripheral structures, workpieces or the like. When various peripheral structures exist or when the workpiece is of a complicated shape, it is difficult to set an operation path to avoid such obstacles.

More specifically, the round-robin method, in which the interference is investigated as to all postures of the articulated robot, is not practical, because the amount of calculation is enormous. No solution exists in some cases in the optimizing method such as the so-called mathematical programming. Further, according to the stochastic technique using random numbers, the convergence of solution is not assured and the calculation has no reproducibility.

Several techniques have been suggested to solve the above problems.

For example, a technique is known, which utilizes a flat plane including a start point and an arrival point (see Japanese Patent Publication No. 2875498). In this technique, an off-limit area, in which a cross section of an obstacle is appropriately enlarged, is defined on a prescribed plane. An operation path, which passes through the apex of the off-limit area, is set to avoid the interference. However, in this technique, the operation path is set by verifying the interference with the off-limit area at every time. For this reason, the verifying operation is complex, and the operation path is complicated. Even if the operation path is proper, it is also impossible to verify whether the articulated robot can actually operate on the operation path from a viewpoint of operation ranges of respective axes.

Another technique is also known, for example, in which the position and the shape of an obstacle are inputted and instructed with an exclusively used controller in a production site to set an operation path (see Japanese Laid-Open Patent Publication No. 9-81228). However, in this technique, the operation path cannot be set automatically, because the teaching is performed while operating the actual machine at the production site.

Accordingly, the above off-line teaching relies on the manual operation to set the operation path for avoiding the obstacles at present.

However, the manual operation needs a long period of time to extract a non-interference area in which the robot does not interfere with the workpiece and other equipments. The judgment also differs depending on individual persons. It is inevitable to cause any oversight and/or any omission for the extraction point.

As described above, when the posture of the robot is determined by means of the off-line teaching, the operation required therefor is not necessarily easy. Especially, it is difficult to retrieve a path for retracting a gun unit from a welding point so that it may not interfere with a workpiece, on a monitor screen, when the workpiece is of a complicated three-dimensional shape. It takes a long period of time to perform the teaching.

DISCLOSURE OF INVENTION

In consideration of the above problems, it is an object of the present invention to provide a setting method and a setting apparatus for an operation path for an articulated robot, in which steps for determining the path are automatically performed, and teaching data can be prepared in a short period of time without requiring any skill, when off-line teaching is performed for a withdrawing path to make no interference with a workpiece, in a narrow-area operation path for withdrawing an end effector from an operation point on the workpiece, of operation paths for an articulated robot.

Another object of the present invention is to provide a setting method and a setting apparatus for an operation path for an articulated robot, in which a wide-area operation path for making movement between operation points or between withdrawing positions can be set automatically and efficiently without performing any complicated calculation which may be affected by the shape of a workpiece and/or an obstacle.

Still another object of the present invention is to provide a setting method and a setting apparatus for an operation path for an articulated robot, in which a narrow-area operation path and a wide-area operation path can be set automatically and efficiently.

According to the present invention, there is provided a method for setting an operation path for an articulated robot including an end effector, the method comprising an internal space-defining step of defining an internal space which is partially surrounded by an arm or electrodes of the end effector; an extracting step of extracting an objective workpiece portion which exists in the internal space, of a workpiece to be welded; and an interference-investigating step of investigating whether interference occurs between the end effector and the objective workpiece portion when the articulated robot is operated.

Accordingly, the steps for determining the path are automatically performed, and teaching data can be prepared in a short period of time without requiring any skill, when off-line teaching is performed for a withdrawing path to make no interference with a workpiece, in a narrow-area operation path for withdrawing an end effector from an operation point on the workpiece.

In this case, the articulated robot, the end effector, the workpiece, and peripheral structures are virtual ones constructed as a model in accordance with a program processing effected by a computer.

The workpiece may be a model which is approximated with a plurality of blocks.

The internal space may be a model which is approximated with a plurality of blocks.

Further, the interference-investigating step may comprise a reference line-defining step of defining a reference line passing through a substantially central portion of the objective workpiece portion; an investigation end position-defining step of setting an investigation end position for the end effector on the reference line; and a first detailed interference-investigating step of investigating whether interference occurs between the end effector and the objective workpiece portion by operating the end effector from an investigation start position to the investigation end position.

The interference-investigating step may comprise a reference line-defining step of defining a reference line passing through a substantially central portion of the objective workpiece portion; a center of gravity position-defining step of defining a center of gravity position of the objective workpiece portion based upon the reference line; and a second detailed interference-investigating step of investigating whether interference occurs between the end effector and the objective workpiece portion by operating the end effector from an investigation start position to the center of gravity position.

A portion of the objective workpiece portion, which is located closely to an opening as compared with the center of gravity position of the objective workpiece portion, may be extracted as a new objective workpiece portion with which the objective workpiece portion is replaced to perform the center of gravity position-defining step and the second detailed interference-investigating step.

According to another aspect of the present invention, there is provided an apparatus for setting an operation path for an articulated robot provided with an end effector, the apparatus comprising an internal space-defining section for defining an internal space which is partially surrounded by an arm or electrodes of the end effector; a workpiece-extracting section for extracting an objective workpiece portion which exists in the internal space, of a workpiece to be welded; and an interference-investigating section for investigating whether interference occurs between the end effector and the objective workpiece portion when the end effector is operated.

According to still another aspect of the present invention, there is provided a method for setting an operation path for an articulated robot for operating an end effector from a start point to an arrival point, the method comprising an operation-investigating step of setting a path for connecting the start point and the arrival point to investigate whether the end effector can be operated along the path; and a retracting path-setting step of setting a retracting path for operating the end effector by a prescribed distance in a prescribed direction from the start point or the arrival point if the end effector cannot be operated along the path in the operation-investigating step.

Accordingly, a wide-area operation path for making movement between operation points or between withdrawing positions can be set automatically and efficiently without performing any complicated calculation which may be affected by the shape of a workpiece or an obstacle.

The prescribed direction may be a predetermined direction based on a posture of the end effector at the start point or the arrival point.

The prescribed direction may be a direction to connect the start point or the arrival point and an established point in space.

The established point may be a central point of an original axis of the articulated robot.

An end point of the retracting path may be defined as a new start point or a new arrival point to execute the operation-investigating step or the retracting path-setting step again.

The retracting path, in which the prescribed distance is corrected, may be set again if an end point of the retracting path is a point at which the articulated robot cannot arrive or a point at which interference occurs.

According to still another aspect of the present invention, there is provided an apparatus for setting an operation path for an articulated robot for operating an end effector from a start point to an arrival point, the apparatus comprising a path-investigating section for setting a path for connecting the start point and the arrival point to investigate whether the end effector can be operated along the path; and a wide-area operation path-setting section for setting a retracting path for operating the end effector by a prescribed distance in a prescribed direction from the start point or the arrival point if the path-investigating section judges that the end effector cannot be operated along the path.

According to still another aspect of the present invention, there is provided a method for setting an operation path for an articulated robot for operating an end effector between operation points for a workpiece, the method comprising a narrow-area operation path-setting step of setting a narrow-area operation path along which the end effector arranged at the operation point for the workpiece is retracted from the operation point to a point located near an end of the workpiece while maintaining a non-interference state with respect to the workpiece and another obstacle, based upon shapes of the obstacle and the workpiece near the operation point; and a wide-area operation path-setting step of setting a wide-area operation path for effecting operation from a start point to an arrival point by combining predetermined prescribed operations provided that the start point and the arrival point reside in predetermined points of points located near the end.

Accordingly, it is possible to set the narrow-area operation path and the wide-area operation path automatically and efficiently.

The narrow-area operation path-setting step may comprise an internal space-defining step of defining an internal space which is partially surrounded by an arm or electrodes of the end effector; an extracting step of extracting an objective workpiece portion which exists in the internal space, of the workpiece; and an interference-investigating step of investigating whether interference occurs between the end effector and the objective workpiece portion when the articulated robot is operated.

The wide-area operation path-setting step may comprise an operation-investigating step of setting a path for connecting the start point and the arrival point to investigate whether the end effector can be operated along the path; and a retracting path-setting step of setting a retracting path for operating the end effector by a prescribed distance in a prescribed direction from the start point or the arrival point if the end effector cannot be operated along the path in the operation-investigating step.

The prescribed direction may be a predetermined direction based on a posture of the end effector at the start point or the arrival point.

The prescribed direction may be a direction to connect the start point or the arrival point and an established point in space.

According to still another aspect of the present invention, there is provided an apparatus for setting an operation path for an articulated robot for operating an end effector between operation points for a workpiece, the apparatus comprising a narrow-area operation path-setting section for setting a narrow-area operation path along which the end effector arranged at the operation point for the workpiece is retracted from the operation point to a point located near an end of the workpiece while maintaining a non-interference state with respect to the workpiece and another obstacle, based upon shapes of the obstacle and the workpiece near the operation point; and a wide-area operation path-setting section for setting a wide-area operation path for effecting operation from a start point to an arrival point by combining predetermined prescribed operations provided that the start point and the arrival point reside in predetermined points of points located near the end.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 10 shows a path table;

FIG. 12A illustrates a procedure for setting solids about centers of points of intersection;

FIG. 12B illustrates a procedure for extracting overlapped portions of the solids and the workpiece;

FIG. 12C shows an extracted workpiece model;

BEST MODE FOR CARRYING OUT THE INVENTION

Illustrative embodiments of the setting method and the setting apparatus for the operation path for the articulated robot according to the present invention will be explained below with reference to FIGS. 1 to 21.

Basically, in the setting method and the setting apparatus for the operation path for the articulated robot according to the embodiment of the present invention, the operation path is set while extracting the portion in which the workpiece exists to investigate the interference in the internal space surrounded by the gun unit during the narrow-area operation in which the end effector provided at the forward end of the articulated robot is withdrawn from the operation point on the workpiece. During the wide-area operation for making movement between the withdrawing positions, the operation path is set to move to the arrival point while avoiding the obstacle by operating while combining the template operations for making movement from the start point by the prescribed distance in the prescribed direction.

Figure 1:
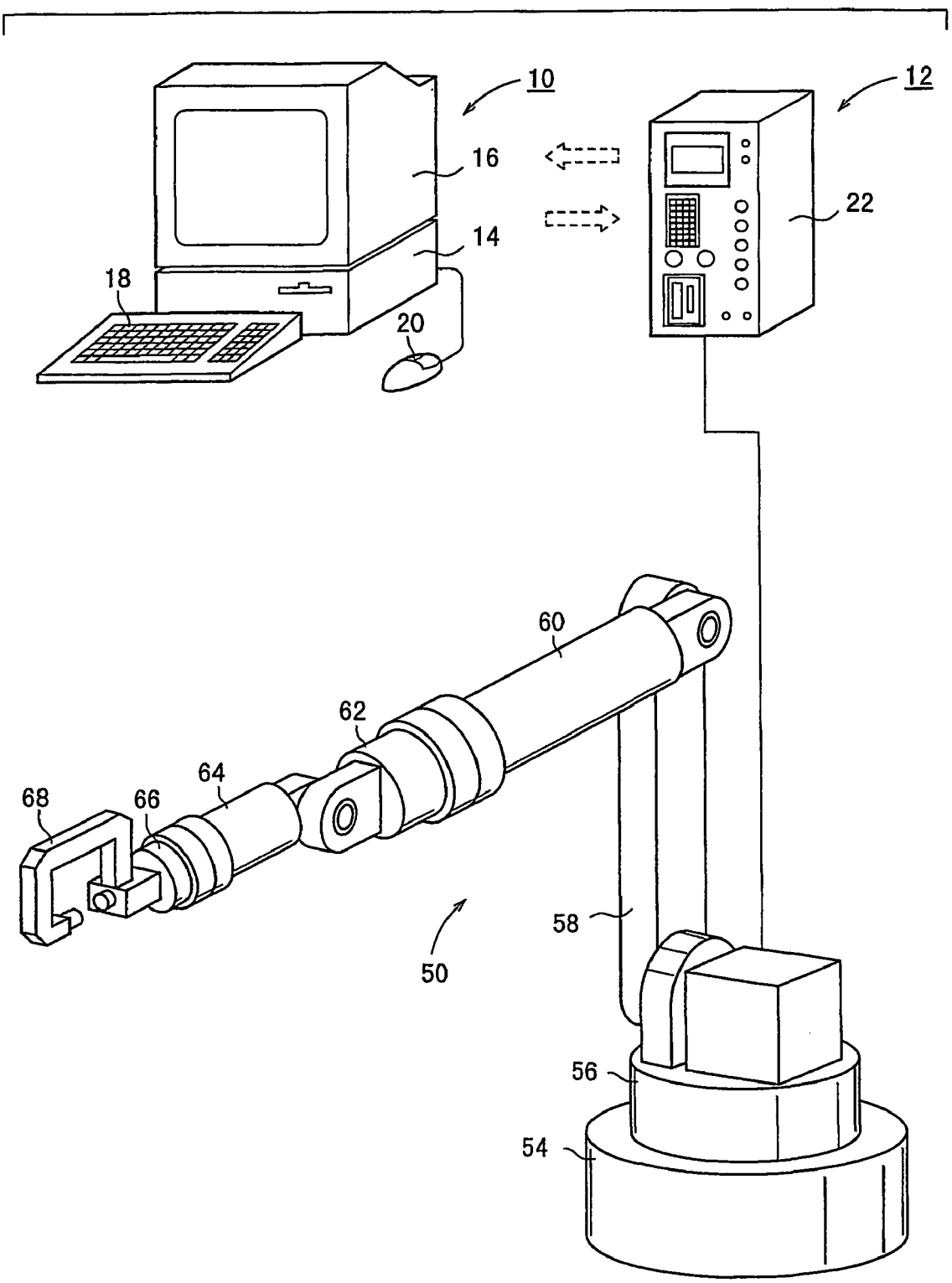
FIG. 1 illustrates an off-line teaching apparatus and a robot apparatus to be used in an embodiment of the present invention.

As shown in FIG. 1, an off-line teaching apparatus (operation path-setting apparatus) 10, which is used in the embodiment of the present invention, performs teaching of the operation of an articulated robot 50. The apparatus 10 is linked to a robot apparatus 12 for performing desired operation for an operation objective based upon prepared teaching data.

The robot apparatus 12 comprises the articulated robot 50, and a robot control unit 22 for controlling the operation of the articulated robot 50 based upon the teaching data.

Figure 2:
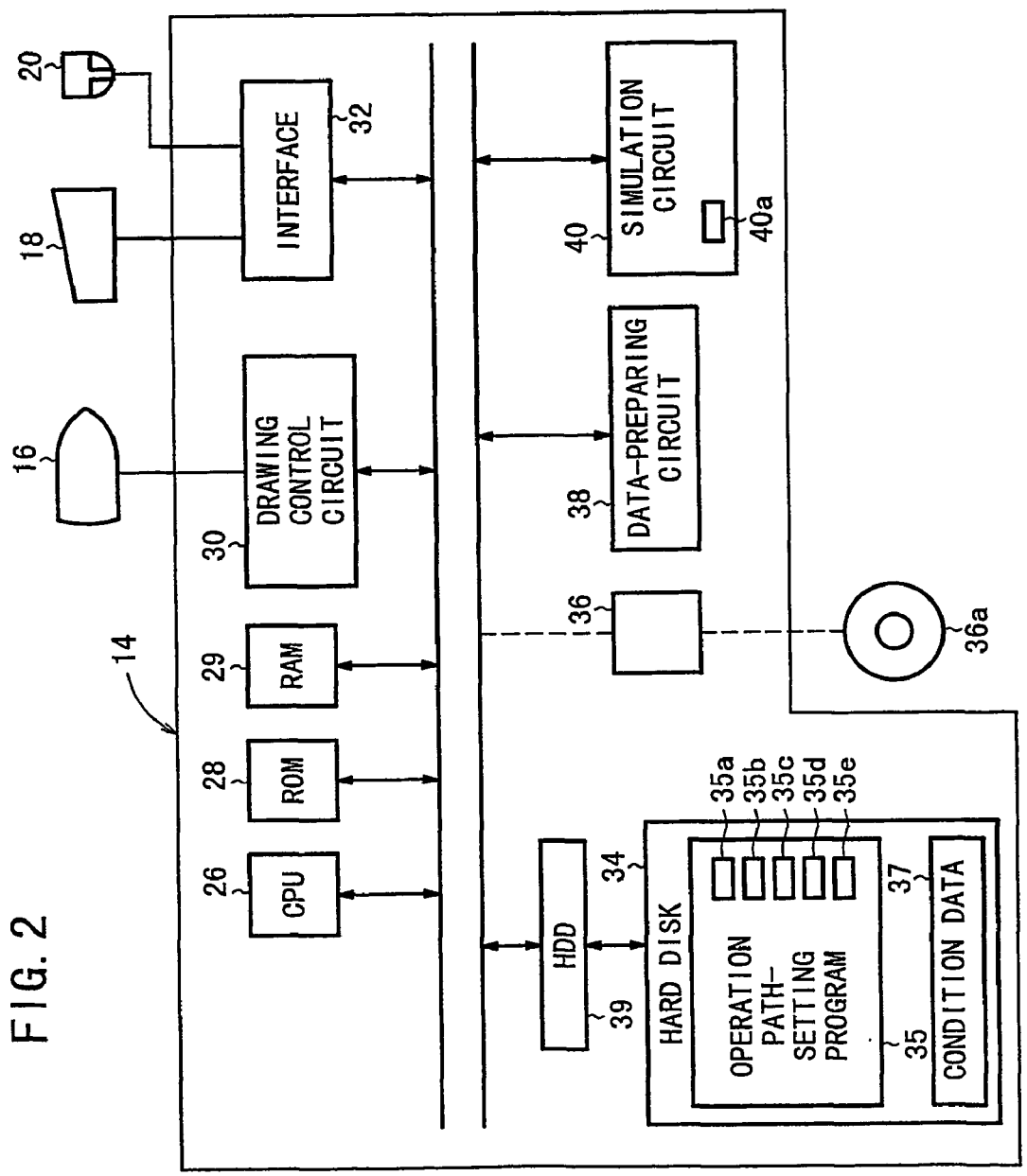
FIG. 2 shows a block diagram illustrating an arrangement of the off-line teaching apparatus.

As shown in FIG. 2, a control unit 14, which constitutes the off-line teaching apparatus 10, includes CPU (computer) 26 as a control means for controlling the entire off-line teaching apparatus 10, ROM 28 and RAM 29 as storage sections, a hard disk drive (HDD) 39 for effecting access of data with respect to the hard disk 34, a drawing control circuit 30 for effecting drawing control on a screen of a monitor 16, an interface circuit 32 to which a keyboard 18 and a mouse 20 as input apparatuses are connected, a recording medium drive 36 for controlling an external recording medium 36a (for example, a flexible disk or a compact disk), a data-preparing circuit 38 for preparing teaching data, and a simulation circuit 40 for effecting simulation on the screen of the monitor 16 based upon the teaching data. The simulation circuit 40 is based on three-dimensional CAD, and it has, for example, the function to prepare the model and investigate the mutual interference of the model (interference-investigating section 40a).

The hard disk 34 stores, for example, an operation path-setting program 35 having the function to set the operation path for an articulated robot 50, condition data 37 as the condition for setting the operation path, and unillustrated OS.

The operation path-setting program 35 includes a narrow-area operation path-setting section 35a for setting, for example, based upon the shape of a workpiece 80, the narrow-area operation path along which a gun unit (end effector) 68, which is arranged on a point on the workpiece 80 (see FIG. 5), for example, on a welding point T0, is retracted to a point located near the end of the workpiece 80 while maintaining the non-interference state with the workpiece 80 and other components, and a wide-area operation path-setting section 35b for setting the wide-area operation path along which the operation is effected from a start point P1 to an arrival point P2 by combining predetermined prescribed operations provided that the start point P1 (see FIG. 17) and the arrival point P2 reside in arbitrary two points in the space.

The operation path-setting program 35 has a path-investigating section 35c for investigating wither or not the gun unit 68 can be operated on the path obtained by connecting two arbitrary points.

The operation path-setting program 35 further includes an internal space-defining section 35d for defining a predetermined internal space in the virtual space, and a workpiece-extracting section 35e for extracting a portion of the workpiece 80 to be welded existing in a predetermined space.

Figure 3:
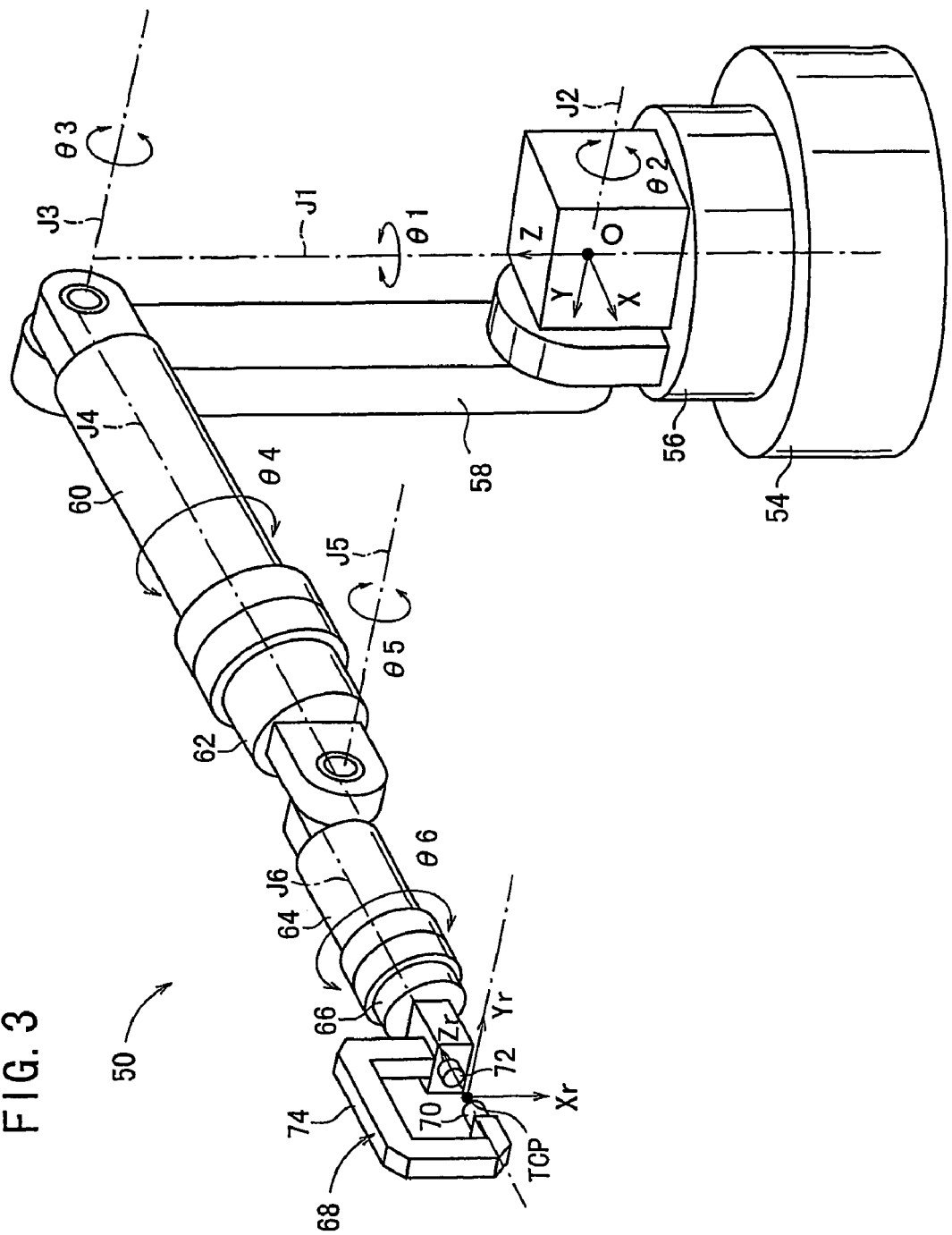
FIG. 3 illustrates an arrangement of an articulated robot.
Figure 4:
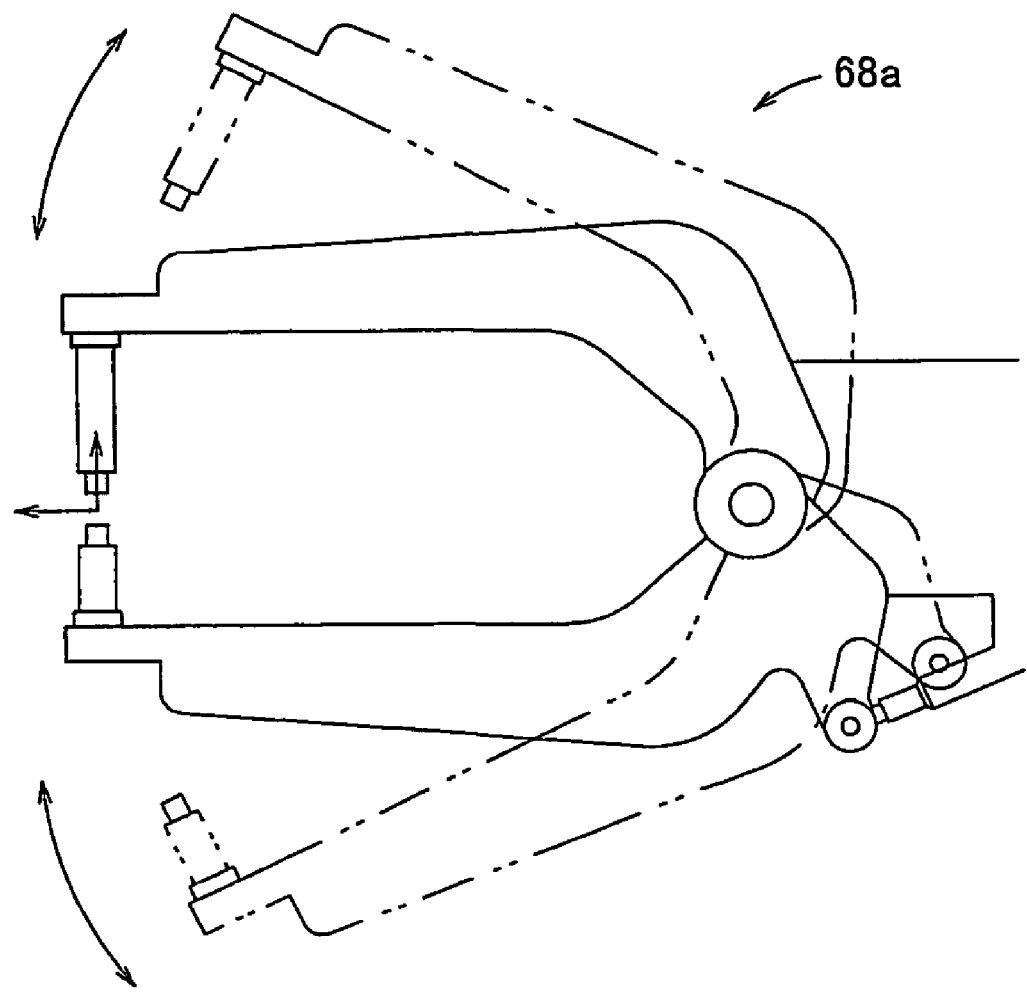
FIG. 4 illustrates an X-type welding gun.

As shown in FIG. 3, a second base 56, a first link 58, a second link 60, a third link 62, a fourth link 64, and a gun attachment section 66 are connected to a first base 54 as an attachment stand of the articulated robot 50 in this order toward the forward end. The gun unit 68 is connected to the gun attachment section 66 disposed at the forward end.

The second base 56 is rotatable supported with respect to the first base 54 about the center of the axis J1 as the vertical axis. The proximal end of the first link 58 is supported tiltably with respect to the second base 56 with the axis J2 as the horizontal axis. The proximal end of the second link 60 is supported swingably with respect to the forward end of the first link 58 with the axis J3 as the horizontal axis. The third link 62 is connected on the forward end side of the second link 60 with the axis J4 as the common central axis for rotation. Further, the proximal end of the fourth link 64 is supported swingably with respect to the forward end of the second link 62 with the axis J5 located in the right-angled direction with respect to the axis J4. The gun attachment section 66 is connected on the forward end side of the fourth link 64 with the axis J6 as the common central axis for rotation.

The gun unit 68, which is connected to the gun attachment section 66, is a so-called C-type welding gun, and it has, at both ends of an arch-shaped arm 74, a pair of electrodes 70, 72 which are openable/closable along the axis J6. In the closed state, the electrodes 70, 72 make contact with the workpiece 80 at the welding operation point (hereinafter referred to as "TCP (Tool Center Point)") for the axis J6.

The direction, which is directed from TCP and which is coincident with the axial center of the electrode 72 of the main body, is designated as "vector Zr". The direction, which is perpendicular to the vector Zr and which is directed outside of the gun unit 68, is designated as "vector Xr". The direction, which is mutually perpendicular to the vector Xr and the vector Zr, is designated as "vector Yr".

The driving mechanism for the axes J1 to J6 and the opening/closing mechanism for the electrodes 70, 72 are driven by unillustrated actuators respectively. TCP is determined by the values of respective angles of rotation $\theta 1$ to $\theta 6$ of the axes J1 to J6 and the sizes of the respective sections of the articulated robot 50.

The gun unit 68 is not limited to the C-type welding gun. For example, an X-type welding gun shown in FIG. 4 (welding gun provided with a pair of opening/closing gun arms rotatably supported by a common support shaft) 68a may be used for the gun unit 68.

The point of intersection between the axis J1 and the axis J2 is defined as the origin (central point of the original axis) O as the reference point for the coordinate calculation and the control in relation to the articulated robot 50. With the reference of the origin O, the vertically upward direction is represented by the height Z, the direction of the axis J2 obtained when the angle of rotation $\theta 1$ satisfies $\theta 1=0$ is represented by the depth Y, and the direction perpendicular to the height Z and the depth Y is represented by the width X. The three-dimensional orthogonal coordinate is expressed with the height Z, the width X, and the depth Y.

Next, explanation will be made with reference to FIGS. 5 and 6 for the procedure for setting the operation path for the articulated robot 50 by using the off-line teaching apparatus 10 and the operation path-setting program 35 constructed as described above.

Figure 5:
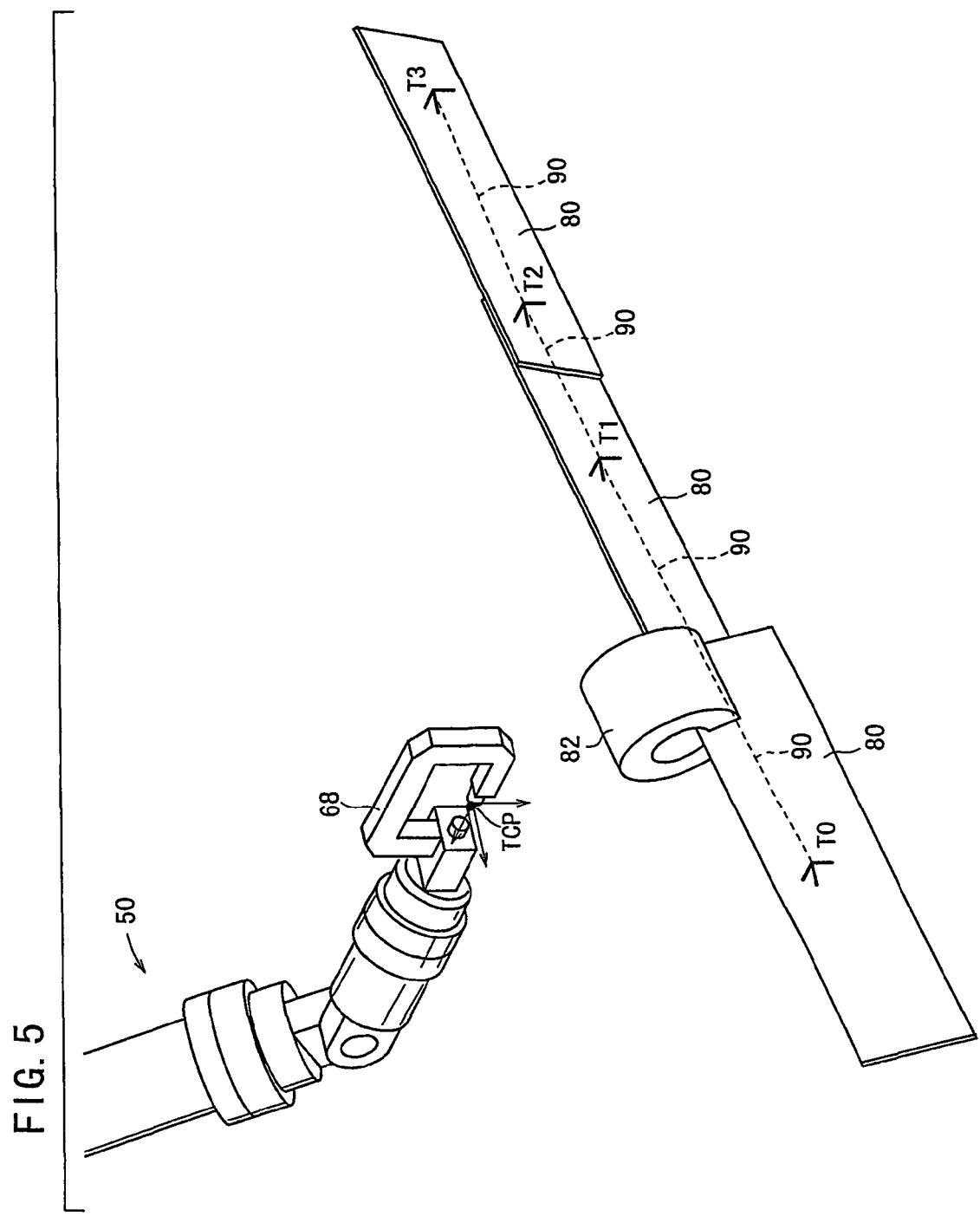
FIG. 5 illustrates welding points for a workpiece.

In the following description, an example will be explained as shown in FIG. 5 in which the gun unit 68 is successively moved between a plurality of welding points (operation points) Tn (n=0, 1, 2, . . . ) for performing the welding for the workpiece 80 which is a thin plate.

The welding point Tn is represented by six values in total including three-dimensional orthogonal coordinate values (X, Y, Z) in the space in which the welding is performed and three parameters of TCP for indicating the posture of the gun unit 68.

Further, it has been already verified that the gun unit 68 of the articulated robot 50 is capable of arriving at the welding point Tn, and the posture of the gun unit 68 when the welding point Tn is welded, i.e., the values of the vector Xr, the vector Yr, and the vector Zr are determined as well.

According to the embodiment of the present invention, further, the articulated robot 50, the workpiece 80, and the peripheral structures are dealt with as virtual models in the off-line teaching apparatus 10. However, in the following description, these components will be represented by the same reference numerals as those of the actual apparatus.

The workpiece 80 is dealt with as the model composed of a plurality of blocks in order to obtain a high speed of the processing.

Figure 6:
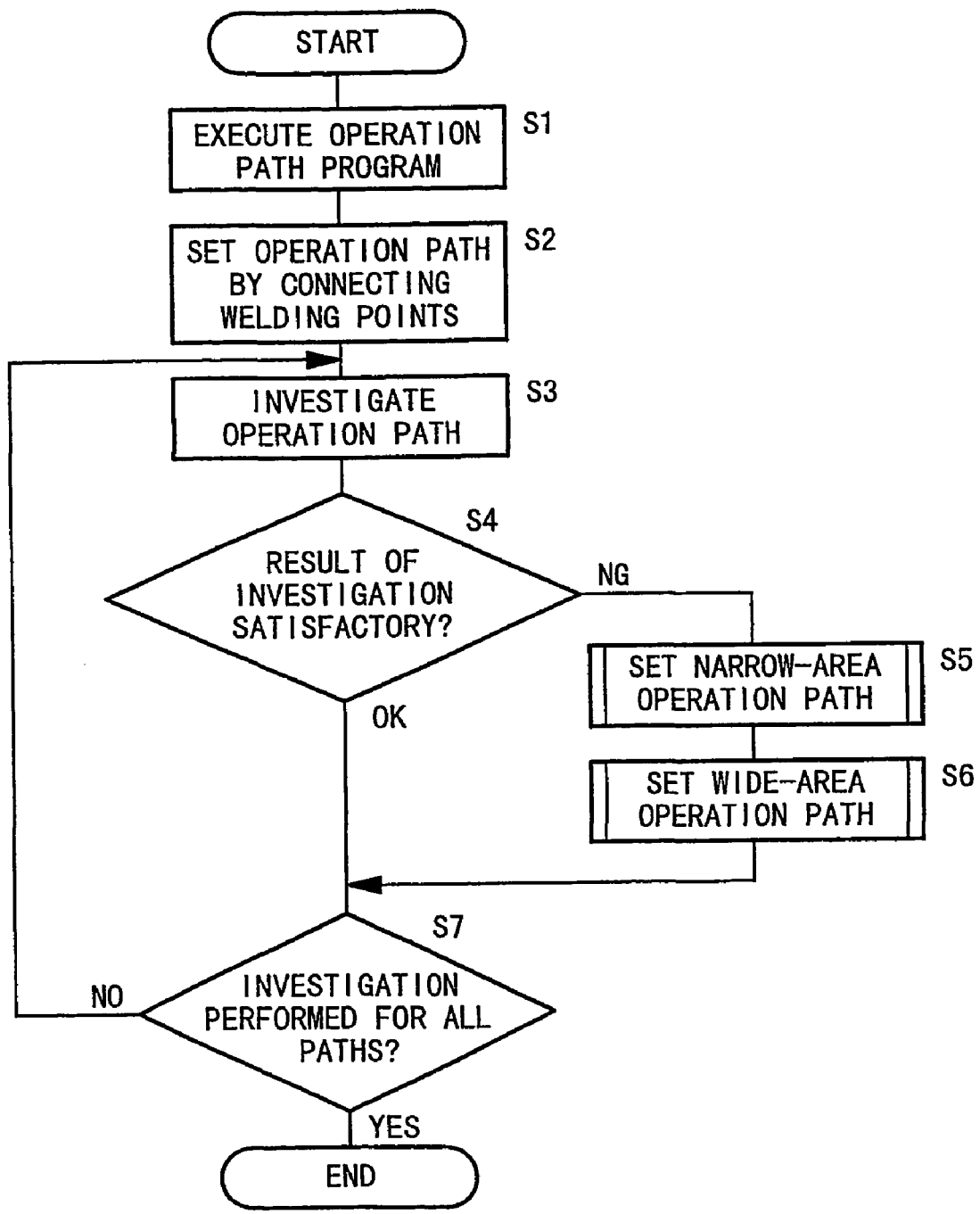
FIG. 6 shows a flow chart illustrating an entire operation path-setting method for the articulated robot according to the embodiment of the present invention.

In step S1 shown in FIG. 6, an operator for the off-line teaching apparatus 10 starts up the operation path-setting program 35 by a predetermined operation method. OS, which is incorporated in the off-line teaching apparatus 10, loads the operation path-setting program 35 stored on the hard disk 34 onto RAM 29 to execute the operation path-setting program 35. The processing of the next step S2 and the followings are executed by the operation path-setting program 35.

Subsequently, in step S2, a temporary operation path 90 (see FIG. 5), which is obtained by connecting the welding points Tn, is set. The operation path 90 may be linear as shown in FIG. 5, or it may be an arbitrary curve along which the articulated robot 50 is operated with ease. Operation paths 100, 102, 104, 110, 112 described later on may be set in the same manner as described above.

Subsequently, in step S3, it is investigated whether the articulated robot 50 is capable of setting the posture when the gun unit 68 is operated along the temporary operation path 90. Further, it is investigated whether the gun unit 68 interferes with other structures or components in the operation path 90.

Specifically, dividing points, which are obtained by dividing the operation path 90 into those having minute lengths, are set. The postures of the articulated robot 50, i.e., the angles of rotation θ1 to θ6, which are provided when the gun unit 68 is arranged at the respective dividing points, are determined. As for the calculation method for the angles of rotation θ1 to θ6, a well-known matrix calculation method (hereinafter referred to as "inverse operation") may be applied, for example, for the sizes of the respective sections of the articulated robot 50 and the six values in total defined by the vector Xr, the vector Yr, and the vector Zr for representing the posture of the gun unit 68 and the spatial position coordinates (X, Y, Z) of the dividing points.

When the posture of the gun unit 68 differs between the welding points T0 and T1, the vector Xr, the vector Yr, and the vector Zr may be defined at the respective dividing points in a manner of linear interpolation. In this investigation, it is assumed that the electrodes 70, 72 are opened so that they may not interfere with the workpiece 80.

If the posture of the articulated robot 50 holds at each of the dividing points, the operation from the welding point T0 to the welding point T1 is actually assured.

Subsequently, in step S4, it is judged whether the solution of the inverse operation is normally determined at each of the dividing points. That is, it is judged whether TCP is capable of arriving at the dividing point. If the solution is not determined, if the value of the angle is without the rotatable range of the axis J1 to J6 even if the solution is determined, or if the articulated robot 50 interferes in the determined posture (for example, interferes with the obstacle 82, other workpieces, and pillars in the factory), then the routine proceeds to step S5. If the solution is normally determined, the solution is within the rotatable range, and no interference occurs, then the routine proceeds to step S7.

The investigation for the interference is automatically performed by the function of the simulation circuit 40. When the simulation circuit 40 is used, it is possible to reliably perform the three-dimensional investigation which is not clear from the screen of the monitor 16 as the two-dimensional expression.

In step S5, the narrow-area operation path, which is used to withdraw the gun unit 68 from the welding points T0 and T1, is set by the function of the narrow-area operation path-setting section 35a. A detailed method therefor will be described later on.

Subsequently, in step S6, the two withdrawing positions Ue (see FIG. 14), which are obtained by the narrow-area operation path, are set as the start point P1 and the arrival point P2 respectively to set the wide-area operation path for moving the gun unit 68 from the start point P1 to the arrival point P2. The setting is performed by the function of the wide-area operation path-setting section 35b. A detailed method therefor will be described later on.

After setting the narrow-area operation path and the wide-area operation path, the routine proceeds to step S7.

In step S7, it is confirmed whether the investigation is performed for all of the operation paths 90 set in step S1 to complete the process. If there is any operation path 90 which is not investigated, the routine returns to step S3 to continue the investigation.

As described above, in the embodiment of the present invention, the welding points Tn are firstly connected to one another by the operation path 90. If the operation path 90 is not applied as it is, the narrow-area operation path for avoiding, for example, any projection of the workpiece 80 and the obstacle 82 is set. Further, the wide-area operation path is set in order to make movement between the withdrawing positions Ue obtained by setting the narrow-area operation path.

When the narrow-area operation path is set, the portion, in which the workpiece exists, is extracted to investigate the interference in the internal space which is partially surrounded by the gun unit 68. Therefore, it is possible to automatically set the path for avoiding any interference with the workpiece.

When the wide-area operation path is set, the template operation is applied, in which the gun unit 68 is moved by a prescribed distance in a prescribed direction. Therefore, it is possible to automatically set the wide-area operation path without performing, any complicated calculation which may be affected by the shapes of the workpiece 80 and the obstacle 82.

Further, the setting of the narrow-area operation path for withdrawing the gun unit 68 of the articulated robot 50 from the welding point Tn on the workpiece 80 and the setting of the wide-area operation path for making movement from the start point P1 to the arrival point P2 are performed by the different processes adapted to the respective processes. Therefore, it is possible to efficiently set the operation path between the welding points Tn.

Next, explanation will be made with reference to FIGS. 7 to 16 for the method for setting the narrow-area operation path in step S5 shown in FIG. 6.

When the narrow-area operation path is set, three methods are principally used in order to determine the path for withdrawing the gun unit 68 from the welding portion of the workpiece 80.

Firstly, a method is used to directly make movement from the welding portion to the withdrawing point. Secondly, a method is used to make movement from the welding point to the center of gravity on the cross section of the workpiece 80. Thirdly, a method is used to extract only a portion of the workpiece 80 disposed closely to the opening of the gun unit 68 so that the withdrawing path is determined by preferentially using the extracted portion.

Figure 7:
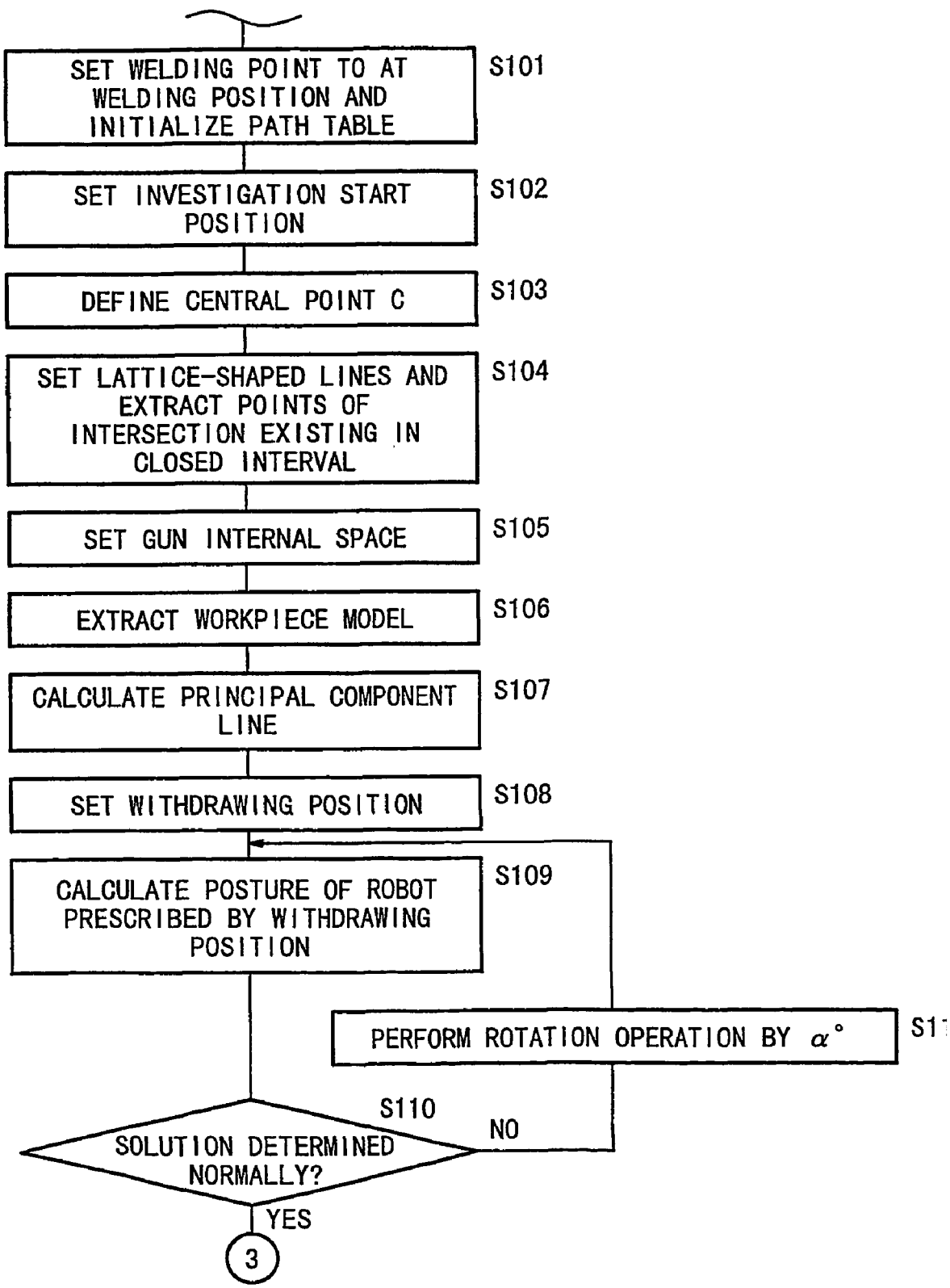
FIG. 7 shows a flow chart (No. 1) illustrating a narrow-area operation path-setting method for the articulated robot according to the embodiment of the present invention.

In step S101 shown in FIG. 7, the gun unit 68 of the articulated robot 50 is set at the position at which the welding point T0 of the workpiece 80 is welded.

The welding point T0 gives the adjustment start position (Ts), and hence it is recorded on the temporary path table 12 for the operation data to perform the initialization (see Order 1 shown in FIG. 10).

As shown in FIG. 10, the path table 120 comprises the column 120a of "Direction of gun unit", the column 120b of "Position of TCP", and the column 120c of "Angle of each axis". The column 120c of "Angle of each axis" includes the angles of rotation θ1 to θ6.

Subsequently, in step S102 shown in FIG. 7, TCP of the gun unit 68 located at the welding point To is set as the investigation start position Ts.

Subsequently, in step S103, the central point C (see FIG. 11A) is defined at the substantial center of the gun unit 68 where the arm 74 and the electrodes 70, 72 are overviewed. Radial straight lines 1090 are set from the central point C at predetermined angle widths to determine points of intersection 1092 on the inner circumferential side of the arm 74 and the electrodes 70, 72.

For the simplified explanation, the points of intersection 1092 are determined on the plane. However, actually, the points of intersection are determined in the three-dimensional shape by utilizing the data in the depth direction as well. Accordingly, the workpiece model (objective workpiece portion) 1096 described later on and the solids (or blocks) 1094 described below are dealt with as three-dimensional shapes not as planar shapes.

Figure 11B:
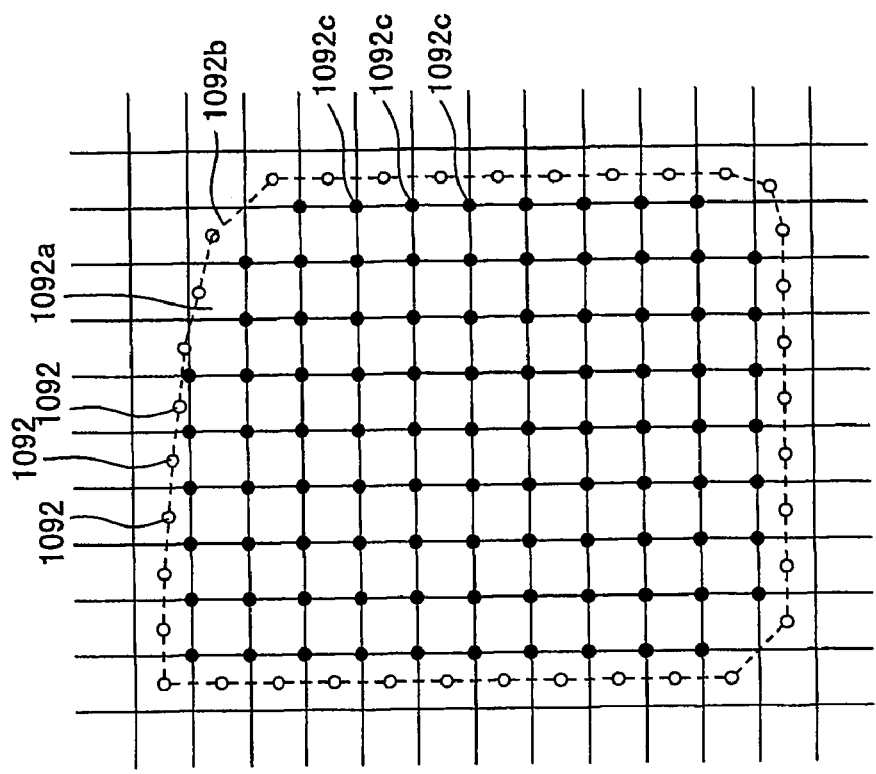
FIG. 11B illustrates a procedure for extracting points of intersection in a closed space by drawing lines in a lattice-shaped configuration.
Figure 11A:
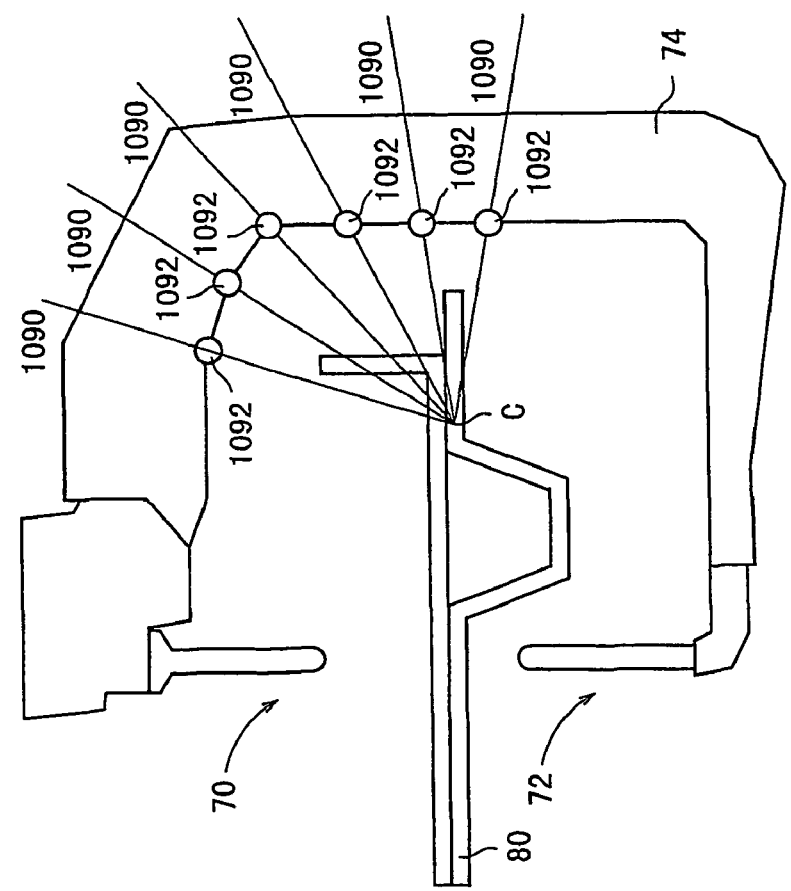
FIG. 11A illustrates a procedure for setting lines radially from the central point.

Subsequently, in step S104, as shown in FIG. 11B, the plurality of points of intersection 1092 are connected with a line segment to set an annular line 1092b for forming a closed interval 1092a. Lattice-shaped lines, which have predetermined spacing distances, are set in the closed interval 1092a to extract points of intersection 1092c existing in the closed interval 1092a, of points of intersection of the lattice-shaped lines.

Subsequently, in step S105, as shown in FIG. 12A, square solids 1094 are embedded about the centers of the extracted points of intersection 1092c so that no gap is formed to set the internal space of the gun.

The processes of steps S103 to S105 are executed by the function of the internal space-defining section 35d.

Subsequently, in step S106, as shown in FIG. 12B, the workpiece 80 is arranged so that the workpiece 80 is matched for relative positions with respect to the gun unit 68 and the gun internal space. A portion, in which the workpiece 80 and the solids 1094 are overlapped with each other, is extracted as a workpiece model 1096 (see FIG. 12C). Then, a portion 80a of the workpiece 80, which is not overlapped with the solids 1094, is excluded, because the portion is irrelevant to the investigation of the interference. The respective solids 1094, which constitute the workpiece model 1096, are distinguished as workpiece solids 1098. Even if the gun unit 68 is moved, the initial positions are fixed for the workpiece model 1096 and the respective workpiece solids 1098.

The process in step S106 is executed by the function of the workpiece-extracting section 35e.

As described above, the process is easily performed, because the workpiece 80 is dealt with as the model with the plurality of blocks. Further, no useless processing is performed, because any unnecessary portion of the workpiece 80 (for example, non-overlapped portion 80a) is automatically excluded.

Subsequently, in step S107, the principal component line (or the reference line) M1 of the workpiece model 1096 is calculated by the technique of principal component analysis.

Figure 13A:
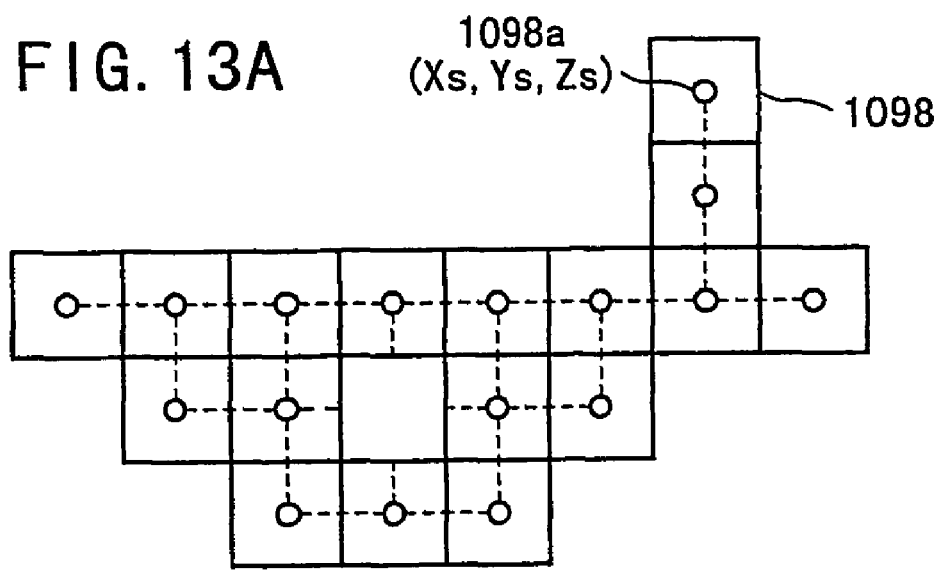
FIG. 13A illustrates central points of the respective solids.

The method for calculating the principal component line M1 will be explained in detail. As shown in FIG. 13A, central point coordinates (Xs, Ys, Zs) of the respective workpiece solids 1098 are defined.

Figure 13B:
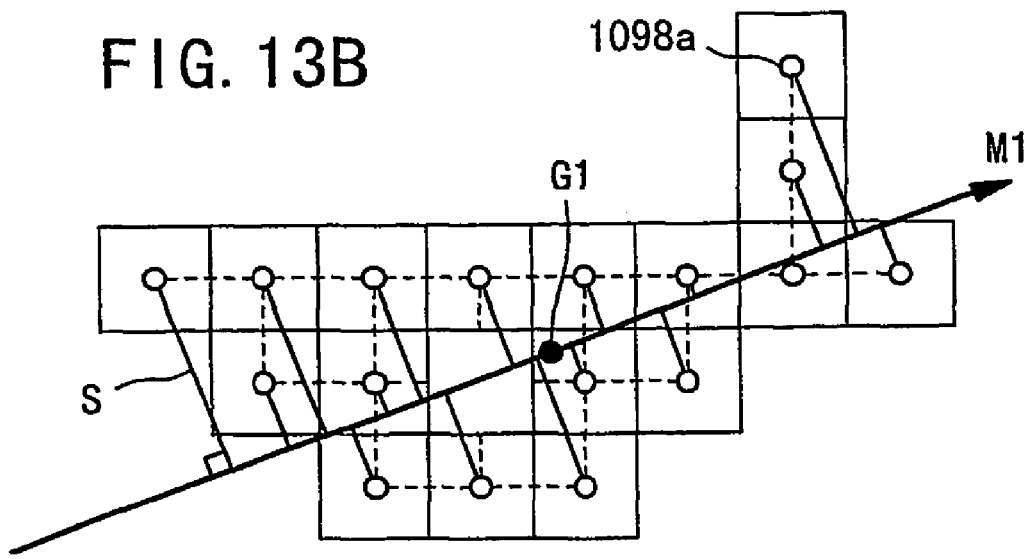
FIG. 13B shows a procedure for determining a principal component line.

Subsequently, as shown in FIG. 13B, the square sum of the distance s between each of the central point coordinates 1098a and the principal component line M1 is made minimum. The principal component line M1 is defined to satisfy the following expression.

$$\Sigma |s|^2 = \min$$

Specifically, the respective central point coordinates 1098a are used to calculate the eigen value and the eigen vector of the variance and covariance matrixes, and Xs, Ys, Zs are used to determine the position of the center of gravity G1 as an average value of the respective coordinates of X, Y, Z. The eigen vector, which passes through the center of gravity position G1, is the principal component line M1.

Figure 14:
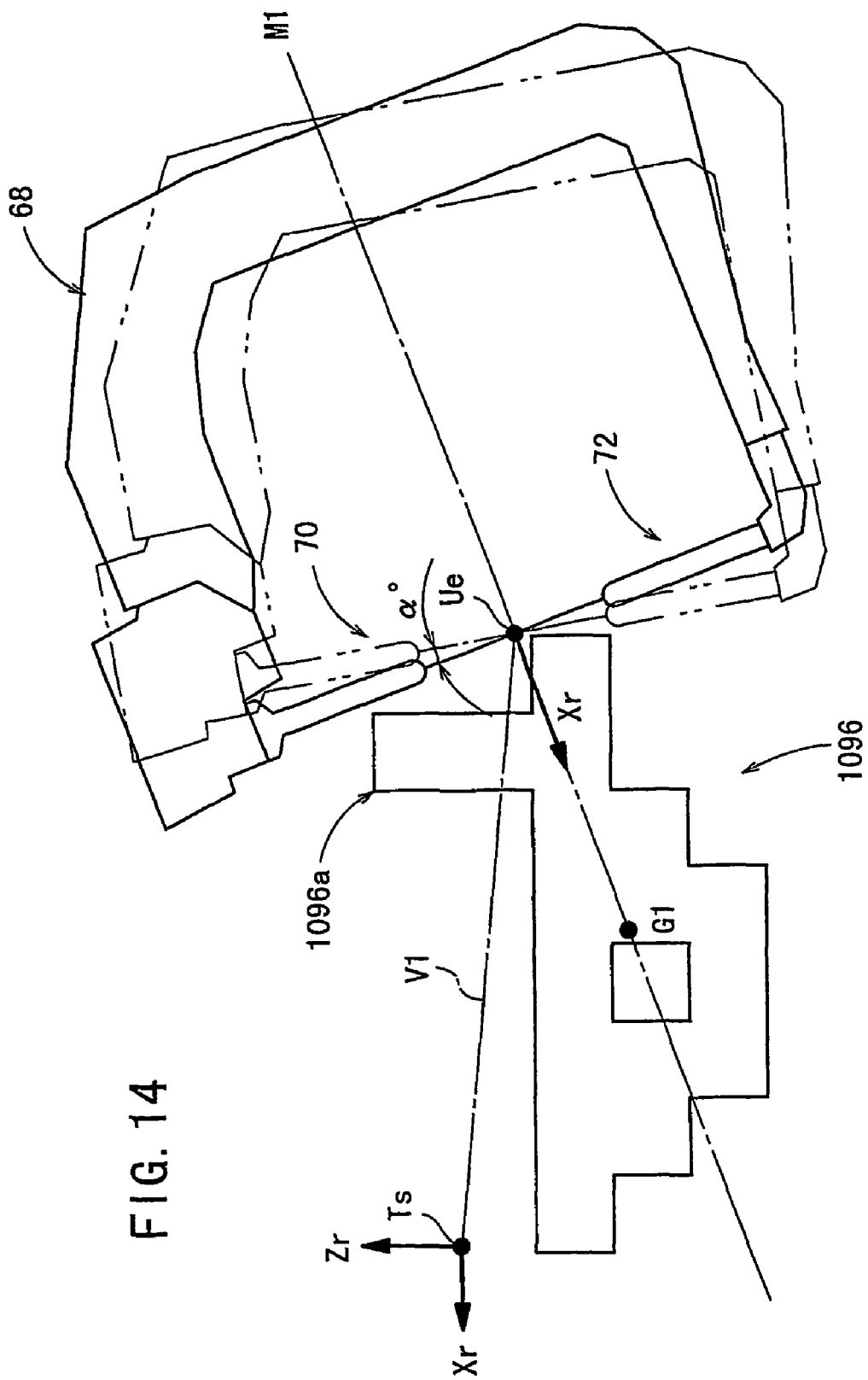
FIG. 14 shows a procedure for determining a withdrawing point and a withdrawing path (V1)

In the following steps S108 to S112, as shown in FIG. 14, it is investigated whether any interference is caused when the operation is performed linearly from the investigation start point Ts to the withdrawing position Ue.

Specifically, in step S108, the withdrawing position Ue is determined. As shown in FIG. 14, the withdrawing position Ue resides in the position on the principal component line M1. The vector Xr, which is based on TCP of the gun unit 68, is moved while making coincidence with the principal component line M1. The place, at which the gun unit 68 and the electrodes 70, 72 do not interfere, is set as the withdrawing position Ue.

Subsequently, in step S109, the posture of the articulated robot 50, i.e., the angles of rotation θ1 to θ6 are determined based upon the position and the posture of the gun unit 68 prescribed by the withdrawing position Ue. In this calculation method, the determination may be made by the inverse operation from the six values in total prescribed by the position coordinates (X, Y, Z) in the space of the withdrawing position Ue and the vector Xr, the vector Yr, and the vector Zr for representing the posture of the gun unit 68.

Subsequently, in step S110 for the branching judgment, it is judged whether the solution is normally determined in the inverse operation in step S109. That is, it is judged whether TCP is capable of arriving at the withdrawing position Ue. If the solution is not determined, if the value of the angle is without the rotatable range of the axis J1 to J6 even if the solution is determined, or if the articulated robot 50 interferes with other structures in the determined posture, then the routine proceeds to step S111. If the solution is normally determined, the routine proceeds to step S112.

In the investigation for the interference, especially when the X-type welding gun 68a is adopted for the gun unit, the investigation is made for both of the open state and the closed state of the gun unit.

If the solution is not determined normally, the rotation operation is performed in step S111 to make rotation by α° about the center of the vector Yr. The rotation operation means the fact that the gun unit 68 is rotated about the center of the withdrawing position Ue within a range to cause no interference with the workpiece model 1096 as indicated by two-dot chain lines shown in FIG. 14. After the vector Xr, the vector Yr, and the vector Zr are determined in this state, the routine returns to step S109. The investigation may be performed assuming that the angle α° has angle values in both of plus and minus directions.

If the loop, which is formed by steps S109 to S111, is continuously executed predetermined number of times, the withdrawing position Ue is set again at an appropriate position which is farther on the principal component line M1 and at which the posture of the articulated robot 50 holds. Next, the routine proceeds to the next step S112.

The process for making the rotation by α° is not limited to the process based on the center of the vector Yr. The process may reside in rotation about the axis, for example, the vector Xr or the vector Zr. Such a process may be adopted in the following process for rotation in the same manner as described above.

Figure 8:
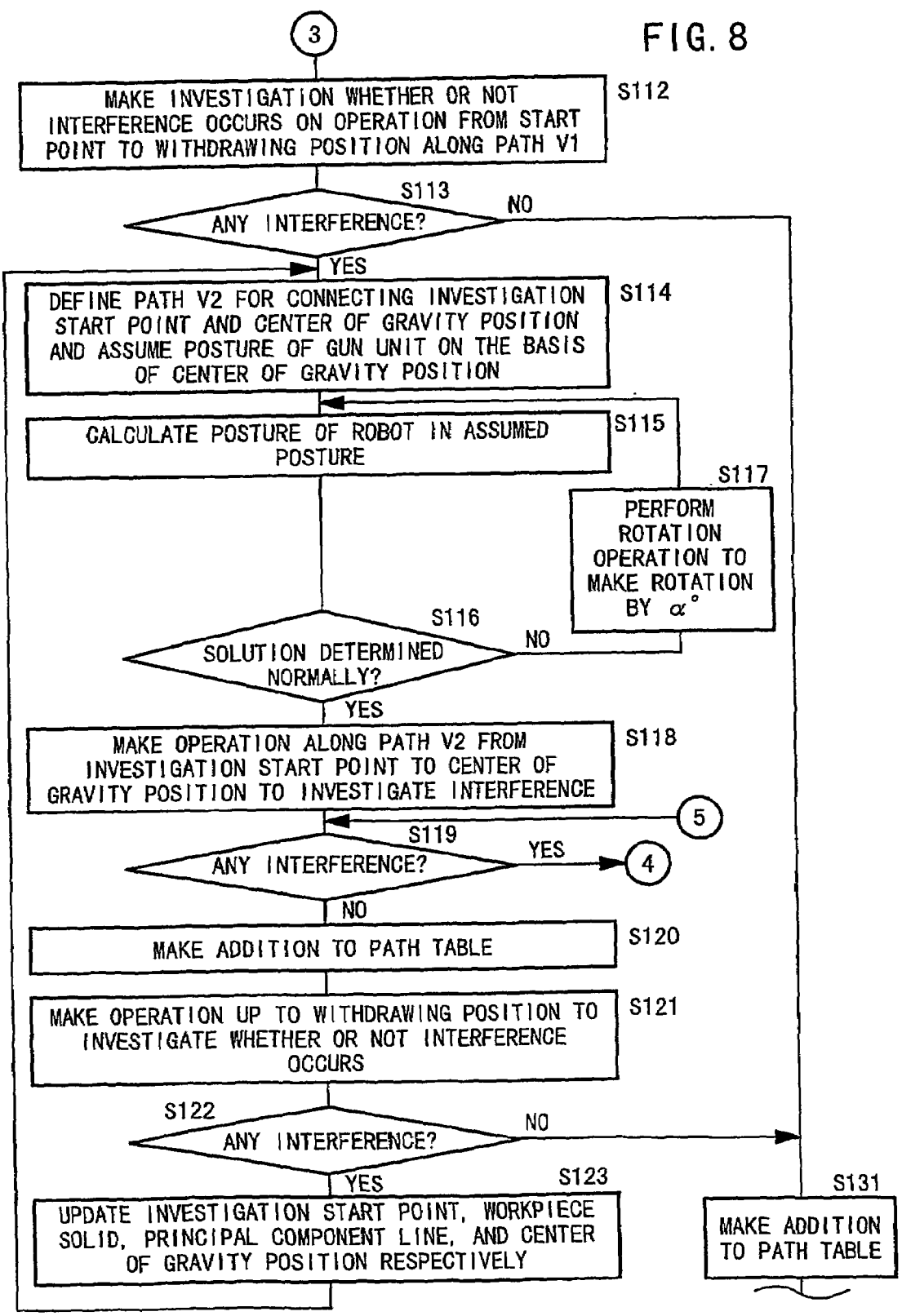
FIG. 8 shows a flow chart (No. 2) illustrating the narrow-area operation path-setting method for the articulated robot according to the embodiment of the present invention.

Next, the routine proceeds to the process shown in FIG. 8. In step S112, as indicated by the path V1 shown in FIG. 14, the gun unit 68 is operated linearly from the investigation start position Ts to the withdrawing position Ue to investigate whether any interference occurs between the arm 74 and the electrodes 70, 72 and the workpiece model 1096.

In step S113 for the branching judgment, if it is judged that any interference occurs according to the investigation in step S112, the routine proceeds to step S114. If it is judged that no interference occurs, the routine proceeds to step S131 as the termination process, because the withdrawing operation can be performed by one time of the operation.

As described above, if the shape of the workpiece 80 is simple, it is possible to shorten the process time, because the withdrawing path can be determined by one time of the operation.

In the example shown in FIG. 14, the electrode 70 clearly interferes with the projection 1096*a* of the workpiece model 1096 during the movement along the path V1. In this case, the routine proceeds to step S114.

In the following steps S114 to S118, it is investigated whether any interference occurs when the operation is performed linearly from the investigation start position Ts to the center of gravity position G1 of the workpiece model 1096.

Figure 15:
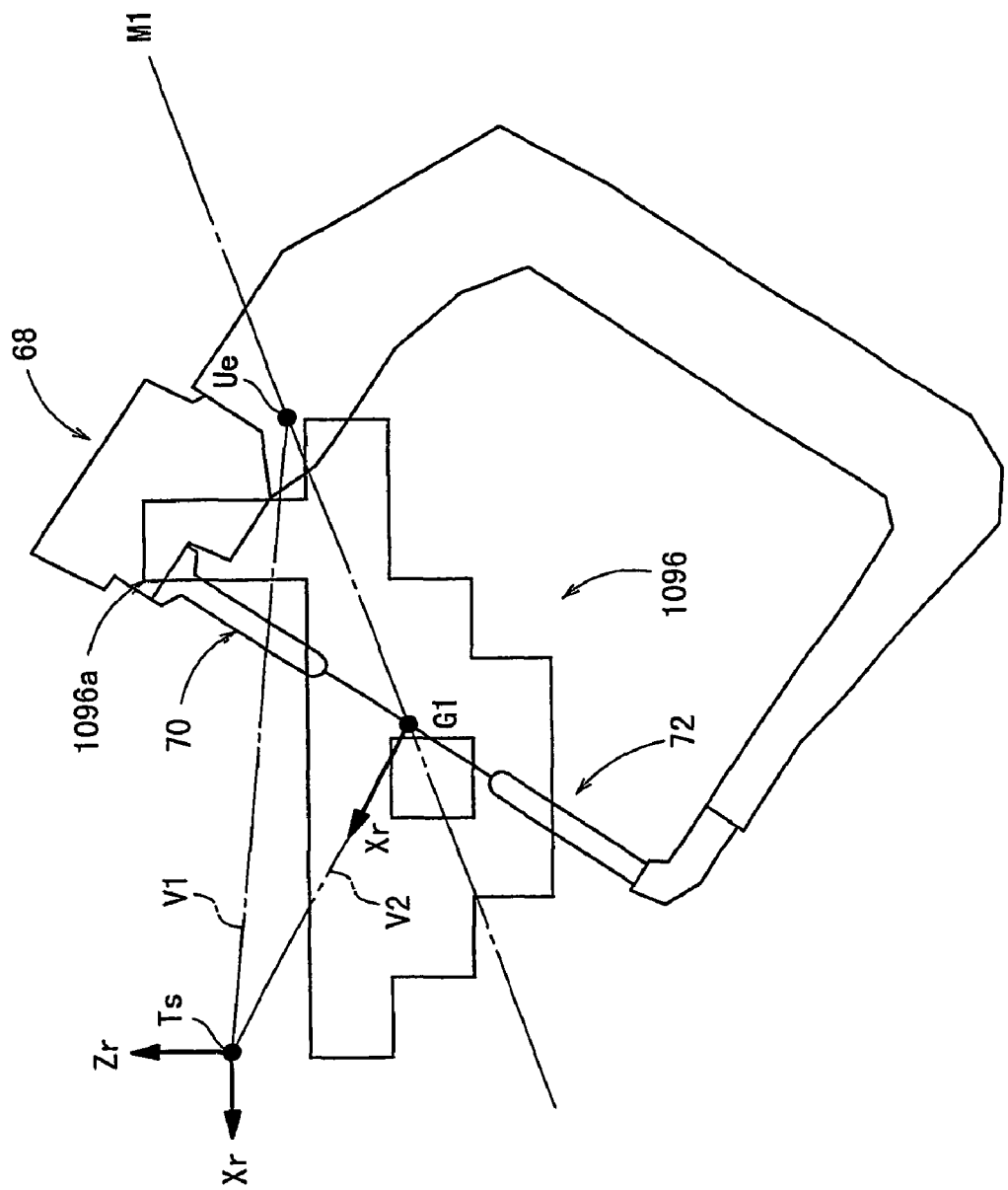
FIG. 15 shows a withdrawing path (V2)

Specifically, in step S114, as shown in FIG. 15, the path V2, which connects the investigation start position Ts and the center of gravity position G1, is defined. The posture of the gun unit 68 is assumed, in which the vector Xr coincides with the path V2 based upon the center of gravity position G1.

In step S115, the posture of the articulated robot 50 is determined with the assumed posture by the inverse operation described above.

Subsequently, in step S116 for the branching judgment, it is investigated whether the solution in the inverse operation is normally determined in the same manner as in step S110. Then, in addition to the inverse operation process, it is also preferable to investigate whether the gun unit 68 interferes with the workpiece model 1096.

If the solution is not determined normally, the rotation operation is performed to rotate by $\alpha°$ about the center of the vector Yr (step S117) in the same manner as in step S111. After the vector Xr, the vector Yr, and the vector Zr are determined in this state, the routine returns to step S115.

If the solution is determined, the interference is investigated by linearly operating the gun unit 68 along the path V2 from the investigation start position Ts to the center of gravity position G1 in step S118 in the same manner as in step S112.

If the loop, which is formed by steps S115 to S117, is continuously executed predetermined number of times, it is judged that the gun unit 68 cannot be arranged at the center of gravity position G1. After this processing is finished, the routine proceeds to step S124 as the mask process.

If it is judged that any interference occurs by the investigation performed in step S118 described above and step S130 described later on, the routine proceeds to step S124 via step S119 for the branching judgment. If it is judged that no interference occurs, the routine proceeds to the next step S120, assuming that the operation is successfully performed up to the center of gravity position.

In step S120, the posture of the articulated robot 50 at that point of time is additionally recorded on the path table 120.

Subsequently, in step S121, the operation is made linearly from the position of the gun unit 68 at that point of time to the withdrawing position Ue in the same manner as in step S112 to investigate whether interference occurs. In the example shown in FIG. 15, the investigation is made along the principal component line M1.

In step S122 for the branching judgment, if it is judged that any interference occurs by the investigation in step S121, the routine proceeds to step S123. If it is judged that no interference occurs, the routine proceeds to step S131 as the termination process, because the withdrawing operation can be performed by this operation.

If there is any interference, the position of the gun unit 68 at that point of time is used as a new investigation start position in step S123 to perform the updating process to make exchange for the previous investigation start position Ts. That is, in the example shown in FIG. 15, it is judged that the portion outside the gun internal space needs not to be considered any more, because the gun unit 68 is successively withdrawn up to the center of gravity position G1. Therefore, the investigation start position Ts is also updated in order to set the workpiece model 1096 again at that point of time.

The workpiece solids 1096 are extracted and updated in the same manner as in step S106 described above. A new principal component line M1 and a new center of gravity position G1 are determined in the same manner as in step S107 described above to update them respectively, and then the routine returns to step S114. After the routine returns to step S114, the processing is continued for the new workpiece solids 1096, the principal component line M1, and the center of gravity position G1 determined in step S123.

As described above, the portion, which is not included in the gun internal space, is successively excluded from the processing objective. Therefore, it is possible to determine the path for withdrawing the gun unit 68 for the workpiece 80 having any complicated shape as well.

However, if the loop, which is formed by steps S114 to S123, is executed not less than predetermined number of times, it is judged that it is extremely difficult to withdraw the gun unit 68 for the workpiece 80. Therefore, the processing is finished to make the plan again.

Next, explanation will be made for steps S124 to S130 as the processing to be performed if it is judged in step S119 that any interference occurs due the operation along the path Vn (n=1, 2, 3, . . . ). In this case, only a portion of the workpiece model 1096, which is located near the opening of the gun unit 68, is extracted (or subjected to the mask process) to preferentially use the extracted portion so that the withdrawing path is determined.

Figure 9:
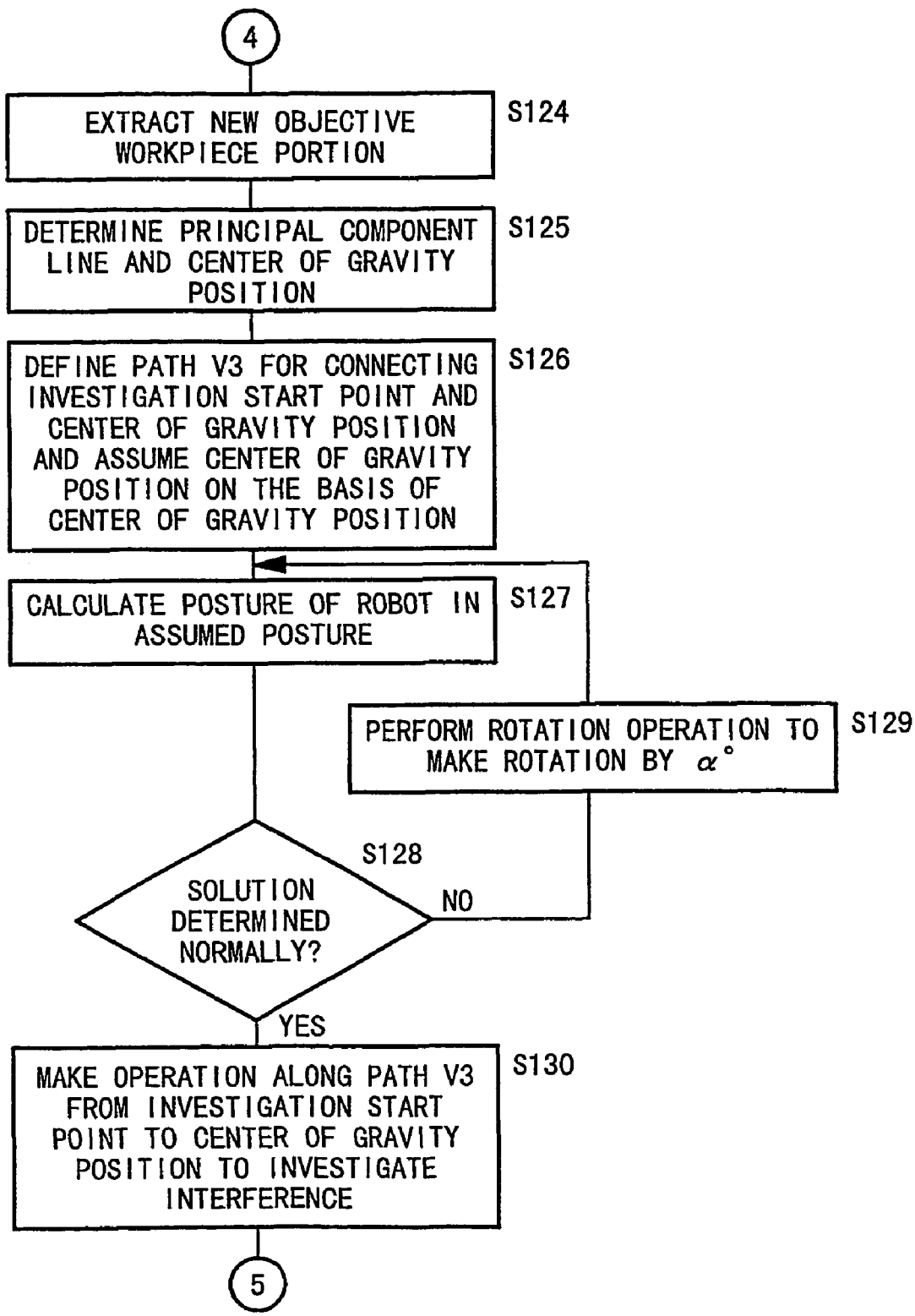
FIG. 9 shows a flow chart (No. 3) illustrating the narrow-area operation path-setting method for the articulated robot according to the embodiment of the present invention.
Figure 16:
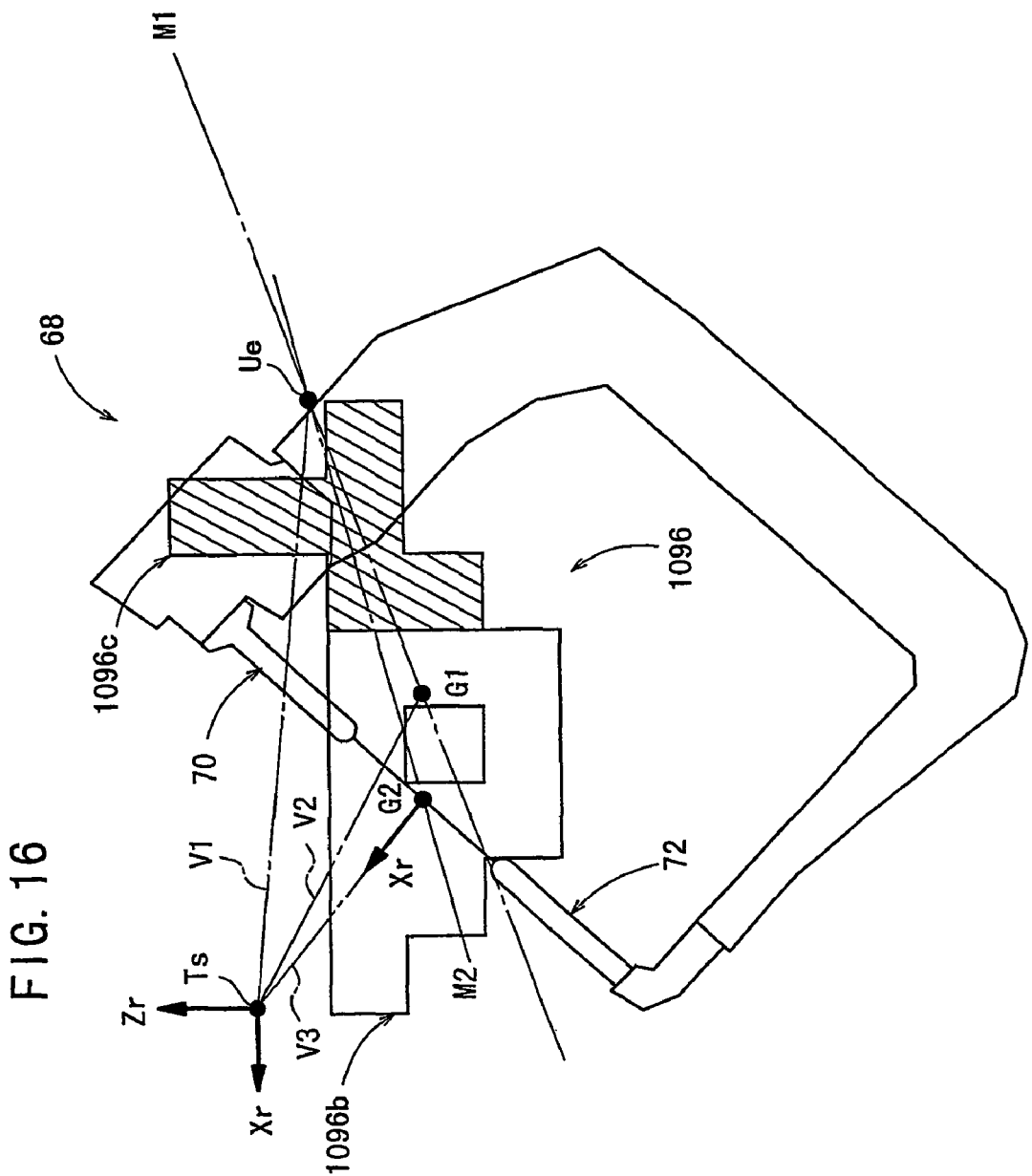
FIG. 16 illustrates a mask process.

In step S124 shown in FIG. 9, as shown in FIG. 16, a portion of the workpiece model 1096, which is located on the side of the opening of the gun unit 68, is designated as a new objective workpiece portion 1096*c* based upon the center of gravity position G1, and the portion is distinguished from a portion 1096*c* which is located on the side opposite to the opening. In the distinguishing process, the process is conceived so that the gun unit 68 is withdrawn for only the portion disposed closely to the opening. The processing is reserved for the portion 1096*c* located on the side opposite to the opening to extract the new objective workpiece portion 1096*b* of the opening. The workpiece model 1096 is replaced with the new objective workpiece portion 1096*b* to be dealt with up to steps S125 to S130 as the downstream processes.

Subsequently, in step S125, the principal component line M2 and the center of gravity position G2 are determined in relation to the new objective workpiece portion 1096*b* in the same manner as in the process in step S107 described above.

In step S126, the path V3 for connecting the investigation start position Ts and the center of gravity position G2 is defined in the same manner as in step S114 described above to assume the posture of the gun unit 68 in which the vector Xr is allowed to coincide with the path V3 based upon the center of gravity position G2.

Subsequently, in step S127, the posture of the articulated robot 50 is determined with the assumed posture by the inverse operation in the same manner as in step S115 described above.

Subsequently, in step S128 for the branching judgment, it is investigated whether the solution in the inverse operation is determined normally in the same manner as in step S116 described above.

If the solution is not determined normally, the rotation operation is performed to make rotation by α° about the center of the vector Yr (step S129) in the same manner as in step S117 described above. The routine returns to step S127.

If the solution is determined, in step S130, the gun unit 68 is linearly operated along the path V3 from the investigation start position Ts to the center of gravity position G2 to investigate the interference in the same manner as in step S118 described above. The routine returns to step S119 to judge the interference investigation.

As described above, even if no appropriate path is found when the path is retrieved for the object of the entire workpiece model 109b, then only the new objective workpiece portion 109bb, which is located closely to the opening of the gun unit 68, can be preferentially used to determine the withdrawing path by applying the mask process to the workpiece model 109b. Further, in the downstream processing, the workpiece model 109b is successively converted into one having the simple shape by combining the updating process for the workpiece model 109b in step S123 described above, making it easy to determine the withdrawing path.

If the loop, which is formed by steps S127 to S129, is continuously executed predetermined number of times, it is judged that the gun unit 68 cannot be arranged at the center of gravity position G2. The routine returns to step S124 in order to perform the further mask process. However, if the mask process is executed not less than predetermined number of times, it is judged that the mask process is not effective for the shape of the workpiece 80. The routine returns to step S120 which is the withdrawing process applied with no mask process to calculate the withdrawing path again.

In step S131 as the termination process, for example, the coordinate of the withdrawing position Ue as the investigation end position and the vector data are added as the operation data to the path table 120 (see FIG. 10). Among them, Un as the operation data is inserted between the respective welding points Tn in the path table 120. Next, the routine returns to the process shown in FIG. 6.

As described above, even if no appropriate path is found when the path is retrieved for the object of the entire workpiece model 109b, then only the portion, which is located closely to the opening of the gun unit 68, can be preferentially used to determine the withdrawing path by applying the mask process to the workpiece model 109b. Further, in the downstream processing, the workpiece model 109b is successively converted into one having the simple shape by combining the updating process for the workpiece model 109b in step S123 described above, making it easy to determine the withdrawing path.

In the above explanation, the technique for determining the path to withdraw the gun unit 68 from the welding point of the workpiece 80 has been described. As for the path for advancing the gun unit 68 into the welding point, the advancing path may be obtained by inverting the order in the path table 120.

The principal component line has been used as the reference line for the workpiece model 109b. Another reference line such as a straight line based on the least square method or a curve having an arbitrary order may be used if the shape of the workpiece model 109b is represented by the line or the curve.

Next, explanation will be made with reference to FIGS. 17 to 21 for the method for setting the wide-area operation path in step S6 shown in FIG. 6.

Figure 17:
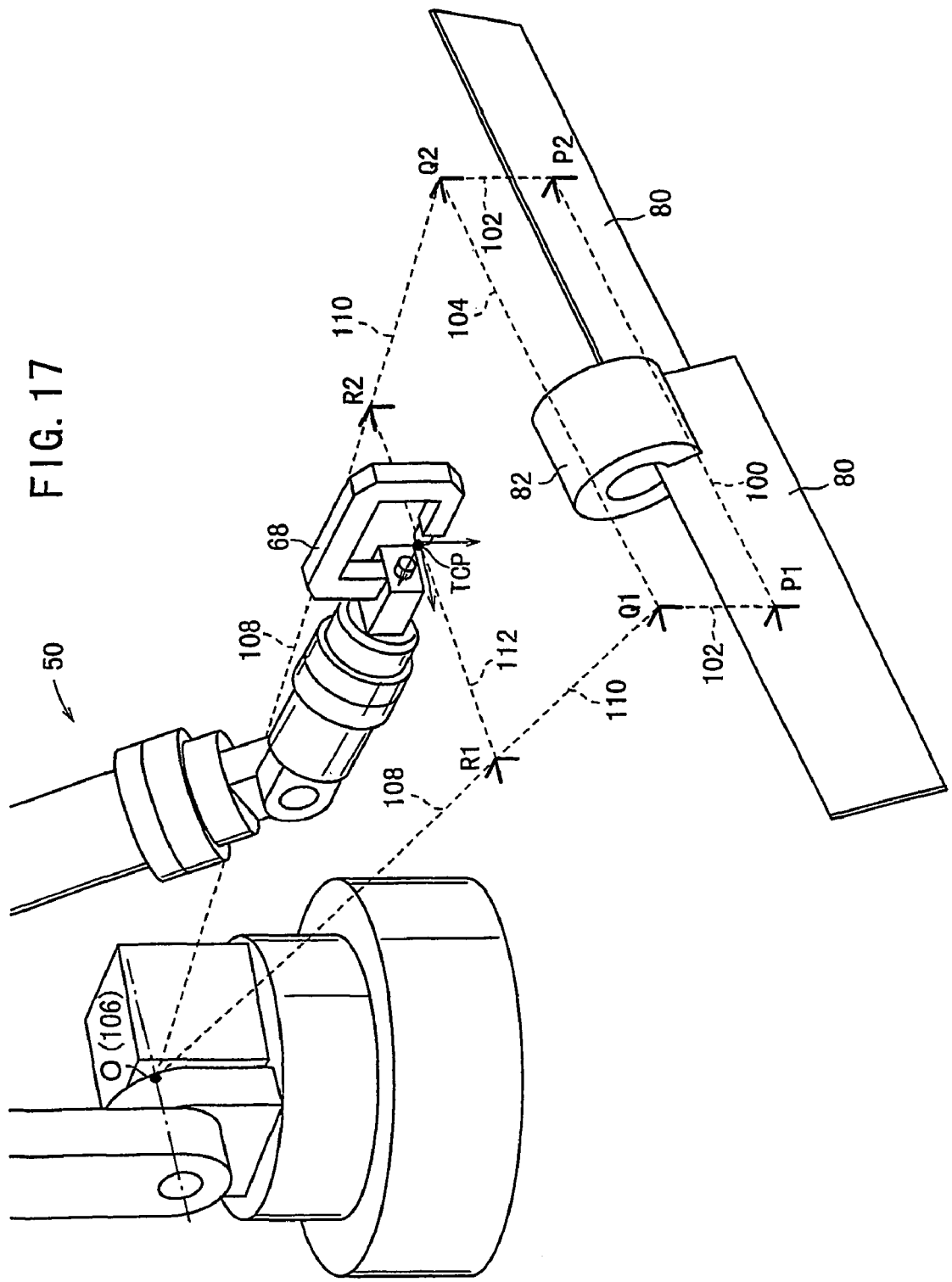
FIG. 17 illustrates an operation path from a start point to an arrival point.

In the following description, as shown in FIG. 17, explanation will be made for an example in which the gun unit 68 is operated from the start point P1 at which the workpiece 80 as the thin plate is disposed to the arrival point P2. It is assumed that the obstacle 82 exists between the start point P1 and the arrival point P2. The withdrawing positions Ue, which are determined in the setting of the narrow-area operation path described above, are dealt with as the start point P1 and the arrival point P2.

Figure 18:
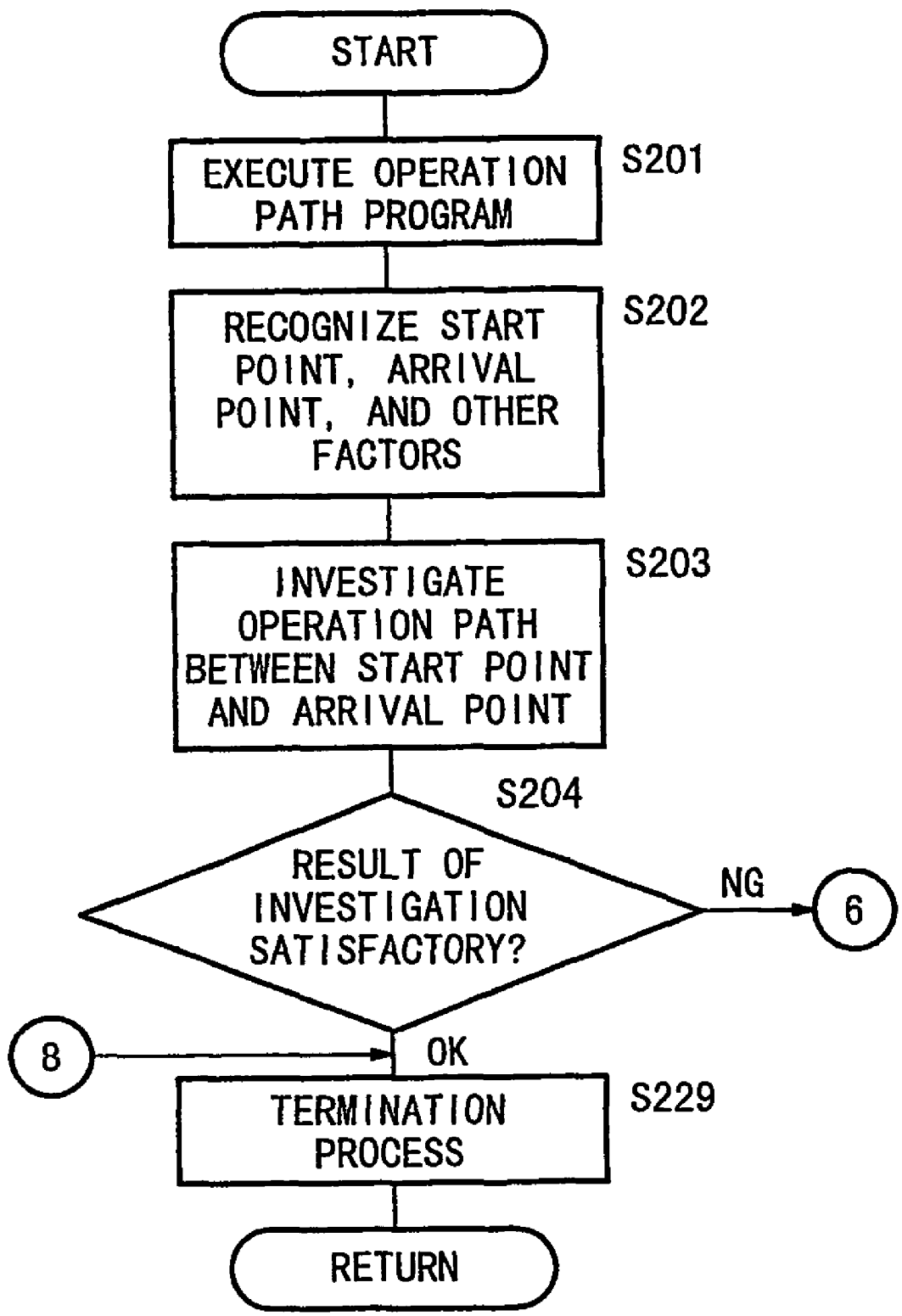
FIG. 18 shows a flow chart (No. 1) illustrating a wide-area operation path-setting method for the articulated robot according to the embodiment of the present invention.

In step S201 shown in FIG. 18, the wide-area operation path-setting section 35b of the operation path-setting program 35 is executed by a predetermined operation method by an operator for the off-line teaching apparatus 10. This process may be continuously performed after the setting of the narrow-area operation path.

In step S202, the wide-area operation path-setting section 35b reads, from the hard disk 34, the condition data 37 as the condition for setting the operation path, and the data is stored in RAM 29. Further, the start point P1 and the arrival point P2 for setting the operation path as well as the shape of the workpiece 80 and the position of the obstacle 82 or the like are recognized from the condition data 37.

Subsequently, in step S203, the operation path (path) 100 to connect the start point P1 and the arrival point P2 is set to investigate the acceptance or rejection of establishment of the posture and the occurrence of any interference when the gun unit 68 is operated along the operation path 100.

Specifically, dividing points, which are obtained by dividing the operation path 100 into those having minute lengths, are set by the function of the path-investigating section 35c. The postures of the articulated robot 50, i.e., the angles of rotation θ1 to θ6, which are obtained when the gun unit 68 is arranged at the respective dividing points, are determined by means of the inverse operation.

When the posture of the gun unit 68 differs between the start point P1 and the arrival point P2, the vector Xr, the vector Yr, and the vector Zr for indicating the posture of the gun unit 68 may be defined at the respective dividing points in a manner of linear interpolation. In this investigation, it is assumed that the electrodes 70, 72 are opened so that they may not interfere with the workpiece 80.

If the posture of the articulated robot 50 holds at each of the dividing points, the operation from the start point P1 to the arrival point P2 is actually assured.

Steps S206, S212, S215, S218, S224, and S227 described later on are also executed by the function of the path-investigating section 35c.

In step S204, it is judged whether the solution of the inverse operation is normally determined at each of the dividing points. Specifically, it is judged whether TCP is capable of arriving at the dividing point. If the solution is not determined, if the value of the angle is without the rotatable range of the axis J1 to J6 even if the solution is determined, or if the articulated robot 50 interferes with the obstacle 82 or the like in the determined posture, then the routine proceeds to step S205. If the solution is normally determined, the termination process is performed for the setting of the wide-area operation path in step S229.

The function of the interference of the simulation circuit 40 may be used for the occurrence of interference.

Figure 19:
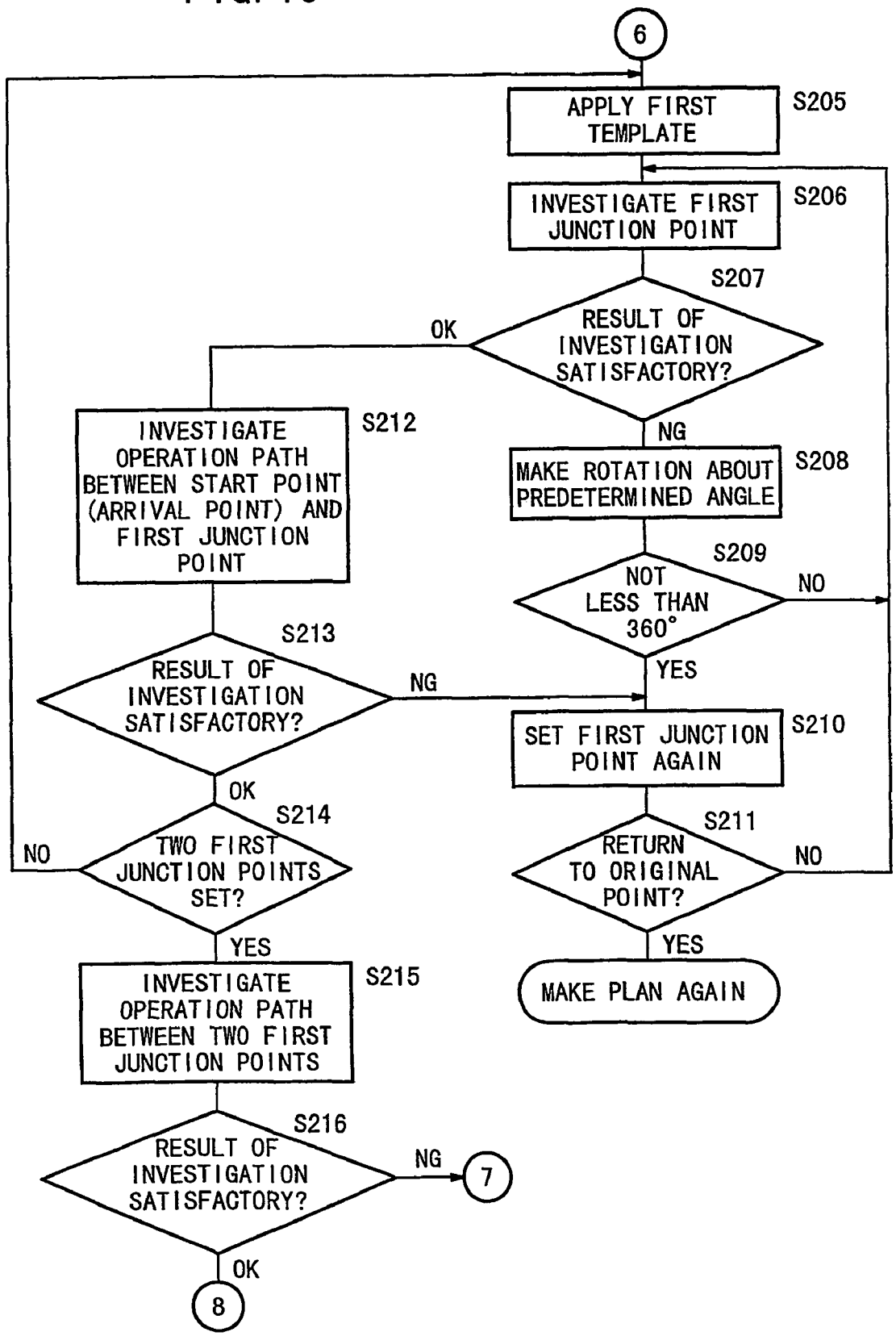
FIG. 19 shows a flow chart (No. 2) illustrating the wide-area operation path-setting method for the articulated robot according to the embodiment of the present invention.

In step S205 shown in FIG. 19, in order to avoid the obstacle 82 or establish the posture, the template operation is applied from the start point P1 for the gun unit 68 to set a first junction point Q1. In this case, the template represents the prescribed operation to be executed by the articulated robot 50.

It is assumed that the first template is applied to the start point P1 and the arrival point P2.

Figure 21:
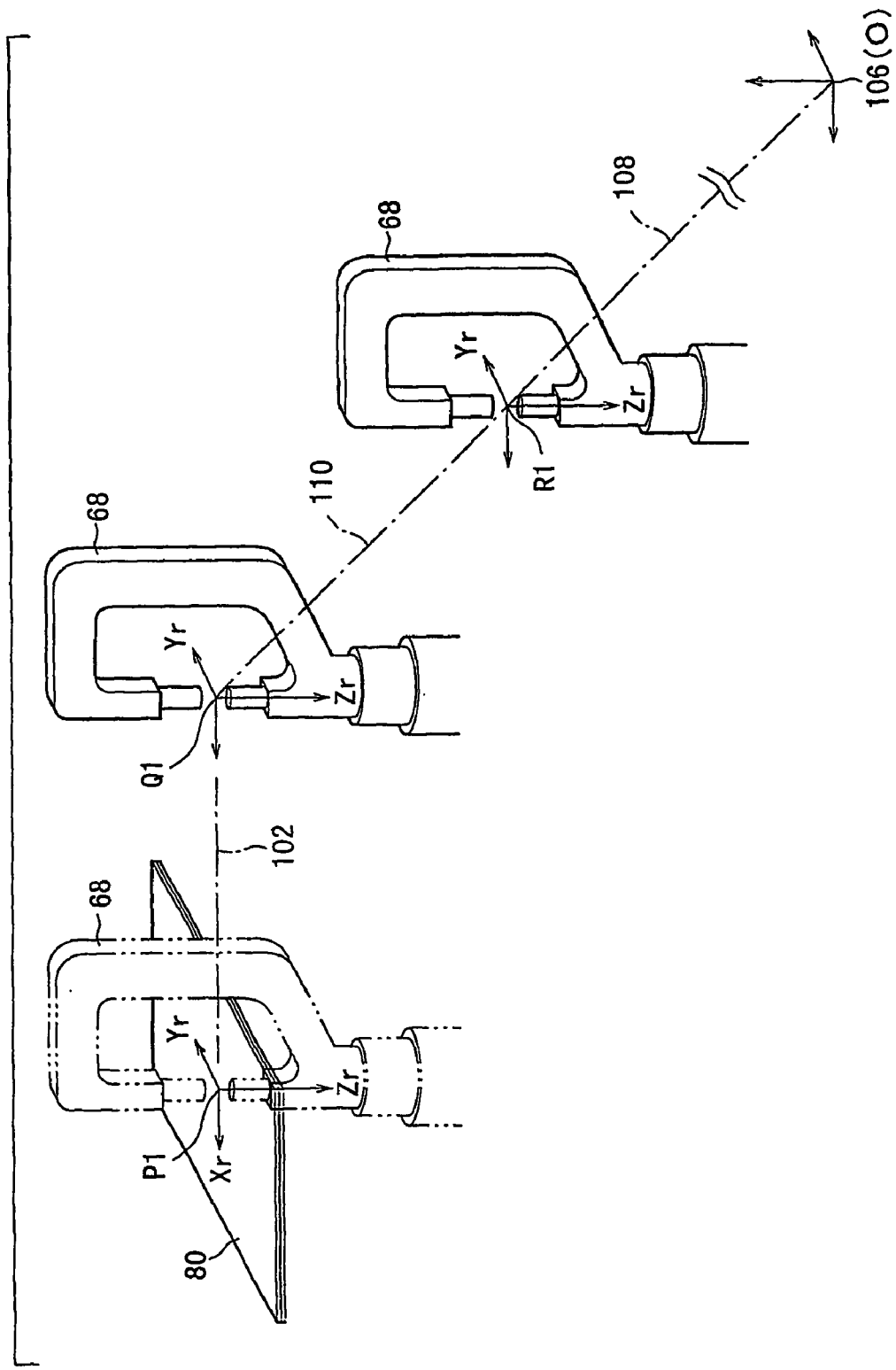
FIG. 21 illustrates the operation of first and second templates.

As shown in FIG. 21, the first template resides in the operation in which the first junction point Q1 obtained by operating in the prescribed direction by the prescribed distance is set based upon TCP of the gun unit 68, and the gun unit 68 is moved along the operation path (retracting path) 102 (see FIG. 17) for connecting the start point P1 and the first junction point Q1. The first junction point Q1 is obtained by moving the position of the start point P1. It is assumed that the direction of the gun unit 68 possessed by the start point P1, i.e., the direction of TCP is unchanged.

In general, in order to properly perform the welding operation, the vector Zr is set to be perpendicular to the workpiece 80. Therefore, it is preferable that the prescribed direction is the withdrawing direction for the gun unit 68, i.e., the direction opposite to the vector Xr. A distance, with which the gun unit 68 can be sufficiently disengaged from the workpiece 80, may be previously prescribed for the prescribed distance depending on the size of the gun unit 68. In the gun unit of a general size, it is preferable that the prescribed distance is 100 mm.

The first template provides an effective retracting method for the thin plate which is a general workpiece. It is possible to set the operation path in accordance with the predetermined convenient retracting method without being affected by the shape of the workpiece.

Subsequently, in step S206, the acceptance or rejection of the posture establishment of the articulated robot 50 at the first junction point Q1 and the occurrence of interference with the peripheral obstacle are investigated in the same manner as in step S203.

Subsequently, in step S207, if it is judged that the posture of the articulated robot 50 holds at the first junction point Q1 and there is no interference as a result of the investigation in step S206, the routine proceeds to step S212. Otherwise, the routine proceeds to step S208.

In step S208, in order to obtain the appropriate posture at the first junction point Q1, the posture is set, in which the gun unit 68 is rotated by a predetermined angle about the center of the vector Xr, Yr or Zr. The rotating process is performed together with step S209 as the next judgment process to make successive rotation for all of the vectors Yr, Zr, and Xr.

Subsequently, in step S209, it is confirmed whether the added up angle of the rotation by the predetermined angle one by one arrives at 360°. If the added up angle is less than 360°, the routine proceeds to step S206 to judge the posture of the articulated robot 50.

If no proper posture is obtained at the first junction point Q1 even if the rotation is performed by 360° for each of the vector Xr, the vector Yr, and the vector Zr, then the first junction point Q1 is set again in step S210 at a position returned by a predetermined distance in the direction toward the start point P1. That is, if the first junction point Q1 is set at the distance of 100 mm from the start point P1, the point is returned by 10 mm in the direction toward the start point P1 to set the point again at the position of 90 mm.

Subsequently, in step S211, the added up value of the distance of the return of the first junction point Q1 is confirmed. If the point is returned to the start point P1 as the original point, then the process is stopped, and the plan is made again. If the point is not returned to the start point P1, i.e., if the range of 10 to 90 mm is given, then the routine proceeds to step S206 to judge the posture of the articulated robot 50.

In step S212 (if it is judged that the posture of the articulated robot 50 holds and no interference is caused in the judgment in step S207 described above), the investigation is performed by the same process as in step S203 for the acceptance or rejection of the posture establishment and the occurrence of the interference when the gun unit 68 is operated along the operation path 102.

Subsequently, in step S213, the judgment is made in the same manner as in step S204. If it is judged that the posture of the articulated robot 50 holds at the dividing point on the operation path 102 and the operation can be performed along the operation path 102, then the routine proceed to the next step S214. If it is judged that the operation cannot be performed, the routine is returned to step S210 to further change the position of the first junction point Q1.

In step S214, it is confirmed that two of the first junction point Q1 and the first junction point Q2 are set for the start point P1 and the arrival point P2. The routine proceeds to the next step S215. If the first junction point Q2 corresponding to the arrival point P2 is not set, the routine is returned to step S205 shown in FIG. 19.

Subsequently, in step S215, the operation path 104 for connecting the two first junction points Q1 and Q2 is set to investigate the acceptance or rejection of the posture establishment and the occurrence of the interference when the gun unit 68 is operated along the operation path 104.

Specifically, the processing is performed while prescribing that the first junction point Q1 is the new start point and the first junction point Q2 is the new arrival point. The investigation is made for the operation path 104 in the same manner as in the investigation for the path between the start point P1 and the arrival point P2 in step S203 described above.

Subsequently, in step S216, the judgment is made in the same manner as in step S204. If it is judged that the posture of the articulated robot 50 holds at the dividing point on the operation path 104 and the operation can be performed along the operation path 104, then the termination process is performed for the setting of the wide-area operation path in step S229 shown in FIG. 18. If it is judged that the operation cannot be performed, the routine proceeds to the next step S217.

Figure 20:
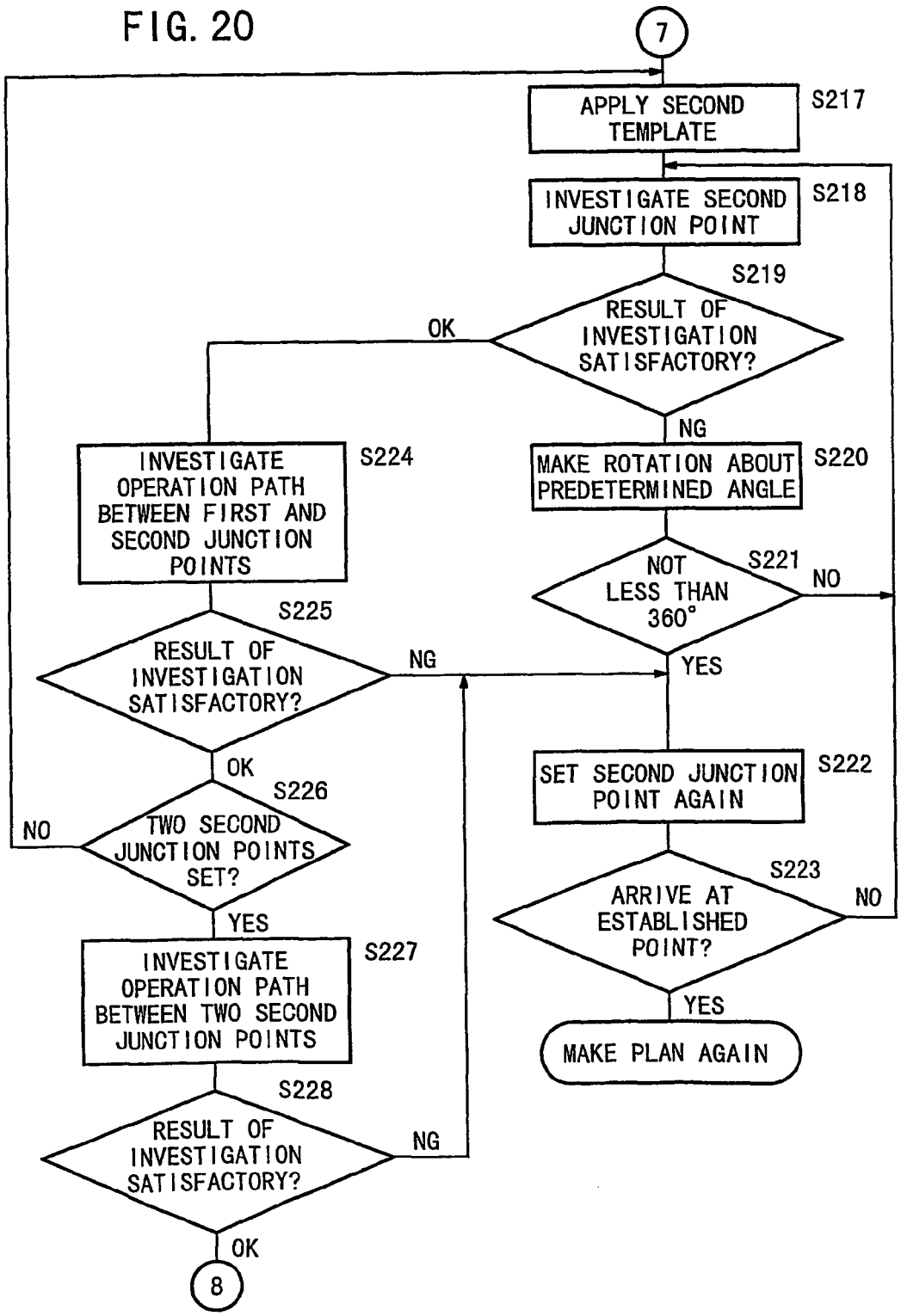
FIG. 20 shows a flow chart (No. 3) illustrating the wide-area operation path-setting method for the articulated robot according to the embodiment of the present invention.

In step S217 shown in FIG. 20, in order to avoid the obstacle 82, the template operation is applied from the first junction point Q1 for the gun unit 68 to set a second junction point R1.

It is assumed that the second template is applied to the first junction point Q1 (and Q2).

As shown in FIG. 21, the second template is used such that the line 108 for connecting the first junction point Q1 and the predetermined established point 106 is set, and the second junction point R1 is defined as the point obtained by moving by a prescribed distance from the first junction point Q1 on the line 108.

The second junction point R1 is obtained by moving only the spatial position for the first junction point Q1. It is assumed that the direction of the gun unit 68 possessed by the first junction point Q1, i.e., the direction of TCP is unchanged.

The second template is provided for the gun unit 68 having been disengaged from the workpiece 80 in order to operate in the direction in which the interfering obstacle 82 does not exist. The movement is made in the direction toward the origin O with the free space in which the possibility of existence of the obstacle 82 is low. That is, in general, the obstacle 82 tends to be absent near the origin O such that the operation of the articulated robot 50 is not inhibited. When the operation is made in this direction, the possibility of avoiding the obstacle 82 is preferably increased. Further, as for the articulated robot of a general size, the prescribed distance is preferably 100 mm.

Those other than the origin O may be used as the established point 106. If there is any place at which the obstacle 82 does not exist or if there is any place at which the operation is easily performed, such a place may be used for the established point 106. For example, when the operation range of the articulated robot 50 is expressed in the space, it is conceived that the degree of freedom of the operation is largest at the central position. Therefore, such a position may be used for the established point 106.

Subsequently, in step S218, the acceptance or rejection of the posture establishment of the articulated robot 50 at the second junction point R1 and the occurrence of any interference with the peripheral obstacle are investigated in the same manner as in step S203.

Subsequently, in step S219, if it is judged that the posture of the articulated robot 50 holds at the second junction point R1 and there is no interference as a result of the investigation in step S218, the routine proceeds to step S224. Other than the above, the routine proceeds to step S220.

In step S220, in order to obtain the appropriate posture at the second junction point R1, the posture is set, in which the gun unit 68 is rotated by a predetermined angle about the center of the vector Xr, Yr, or Zr in the same manner as in step S208.

Subsequently, in step S221, it is confirmed whether the added up angle of the rotation by the predetermined angle one by one arrives at 360°. If the added up angle is less than 360°, the routine proceeds to step S218 to judge the posture of the articulated robot 50.

If no proper posture is obtained at the second junction point R1 even if the rotation is performed by 360° for each of the vector Xr, the vector Yr, and the vector Zr, then the second junction point R1 is set again in step S222 at a position obtained by movement by a predetermined distance in the direction toward the established point 106. That is, if the second junction point R1 is set at the distance of 100 mm from the first junction point Q1, the point is further moved by 100 mm in the direction toward the established point 106 to set the point again at the position of 200 mm.

Subsequently, in step S223, the added up value of the distance of the movement of the second junction point R1 is confirmed. If the point arrives at the established point 106, then the process is stopped, and the plan is made again. If the point does not arrive at the established point 106, the routine proceeds to step S218 to judge the posture of the articulated robot 50.

In step S224 (if it is judged that the posture of the articulated robot 50 holds and no interference is caused in the judgment in step S219 described above), the operation path (retracting path) 110 for connecting the first junction point Q1 and the second junction point R1 is set. The investigation is performed by the same process as in step S203 for the acceptance or rejection of the posture establishment and the occurrence of the interference when the gun unit 68 is operated along the operation path 110.

Subsequently, in step S225, the judgment is made in the same manner as in step S204. If it is judged that the posture of the articulated robot 50 holds at the dividing point on the operation path 110 and the operation can be performed along the operation path 110, then the routine proceed to the next step S226. If it is judged that the operation cannot be performed, the routine is returned to step S222 to further change the position of the first junction point Q1.

In step S226, it is confirmed that two of the second junction points R1 and R2 are set for the first junction points Q1 and Q2. The routine proceeds to the next step S227. If the second junction point R2 corresponding to the first junction point Q2 is not set, the routine is returned to step S217.

Subsequently, in step S227, the operation path 112 for connecting the two second junction points R1 and R2 is set to perform the investigation for the operation on the operation path 112 in the same manner as in step S203.

Subsequently, in step S228, the judgment is made in the same manner as in step S204. If it is judged that the posture of the articulated robot 50 holds at the dividing point on the operation path 112 and the operation can be performed along the operation path 112, then the termination process is performed for the setting of the wide-area operation path. If it is judged that the operation cannot be performed due to the interference with the obstacle or the like, then the routine is returned to step S222, and the two second junction points R1, R2 are further moved to repeat the process until the operation path holds.

After completing the setting of the operation path from the start point P1 to the arrival point P2, the termination process is performed for the setting of the wide-area operation path in step S229 shown in FIG. 18. The termination process includes, for example, the recording of the set wide-area operation path on the path table 120 (see FIG. 10). The start point P1, the first junction point Q1, the second Junction point R1, the second junction point R2, the first junction point Q2, and the arrival point P2, which are included in the set operation path, are recorded in an order of operation on the path table 120. Specifically, the values of the angles of rotation θ1 to θ6 about the respective axes of the articulated robot 50 and the values of the vectors Xr, the vector Yr, and the vector Zr indicating TCP and the position coordinates (X, Y, Z) at the respective points are recorded.

The operation path recorded on the path table 120 is converted by the data-preparing circuit 38 into the program data for operating the actual articulated robot 50, and the data is transmitted to the robot control unit 22.

The path table 120 is recorded in RAM 29 and the hard disk 34. However, if necessary, the path table 120 may be printed or displayed on the screen of the monitor 16.

In the foregoing description, the operation path 104 is the path for connecting the first junction points Q1 and Q1. Alternatively, the first template may be applied to only the side of the start point P1 to determine the first junction point Q1, and the application may be made as it is for the arrival point P2 to set the path for connecting the first junction point Q1 and the arrival point P2.

As for the operation path 112, for example, the path for connecting the second junction point R1 and the first junction point Q2 may be set in the same manner as described above.

The operation paths 102, 110 as the retracting path for making the retraction from the start point P1 may be also used when the operation is made to another point other than the arrival point P2.

The prescribed distance, which is firstly applied for the first template, is 100 mm. Alternatively, starting from 10 mm, the distance may be elongated to 20 mm and 30 mm.

The order of application of the first and second templates may be inverted depending on the situation concerning, for example, the workpiece 80 and the obstacle 82.

The set path table 120 indicates the wide-area operation path from the start point P1 to the arrival point P2 or the narrow-area operation path for representing the withdrawing operation from the welding point Tn. However, the operation paths are reversible, and they may be used upon the operation from the arrival point P2 to the start point P1. Further, the path may be utilized up to an intermediate position without using the entire operation path.

Further, the embodiment of the present invention is applicable, for example, to an assembling robot and an applying robot other than the welding robot. The articulated robot 50 may have a seven-axis structure or a structure having, for example, a link mechanism or an expansion/contraction mechanism.

As described above, according to the embodiment of the present invention, the operation path 100 for connecting the start point P1 and the arrival point P1 is firstly set to investigate whether the gun unit 68 can be operated along the operation path 100. Therefore, if the gun unit 68 can be operated along the operation path 100, the operation path can be set extremely conveniently without providing any junction point or the like for the operation. Even if the operation on the operation path 100 cannot be performed, the first template is applied to operate by the prescribed distance in the direction opposite to the vector Xr as the prescribed direction from the start point P1 or the arrival point P2. Therefore, the first junction points Q1 and Q2 can be set automatically and efficiently without performing any complicated calculation and without being affected by the shape of the workpiece 80.

The first template is used to operate by the prescribed distance with which the gun unit 68 can be sufficiently retracted from the workpiece 80 depending on the size of the gun unit 68 in the prescribed direction set in the direction in which it is conceived to retract the gun unit 68 most easily with respect to the workpiece 80. Therefore, although the method is convenient, the possibility of the successful and safe retraction from the workpiece 80 is high. Further, for example, in step 206, the safety is verified. Therefore, there is no fear of interference or the like when the articulated robot 50 is actually operated.

According to the embodiment of the present invention, if the first junction points Q1, Q2 or the second junction points R1, R2, which are set on the retracting path, are the points at which the articulated robot 50 cannot arrive or at which any interference occurs, the prescribed distances of the first and second templates are corrected to set the positions of the first junction points Q1, Q2 or the second junction points R1, R2 again. Therefore, it is possible to set the preferable retracting position.

As for the second template, the prescribed direction is the direction toward the origin O for the coordinate calculation for the articulated robot 50. Therefore, the possibility of interfering with the obstacle 82 is low.

Further, according to the embodiment of the present invention, the first template and the second template are applied in combination. The gun unit 68 is firstly retracted from the workpiece 80 with the first template, and then the gun unit 68 is retracted from another obstacle 82 or the like with the second template to thereby verify the safety. Therefore, it is possible to set the retracting path and the wide-area operation path automatically and efficiently without performing any complicated calculation. Thus, it is of course possible to improve the operation efficiency. Further, it is also possible to improve the quality of the off-line teaching data without relying on the skill of the operator.

It is a matter of course that the setting method and the setting apparatus for the operation path for the articulated robot according to the present invention are not limited to the illustrative embodiments described above, which may be embodied in other various forms without deviating from the gist or essential characteristics of the present invention.

The invention claimed is:

1. A method for setting an operation path for an articulated robot including an end effector, said method comprising:
    an internal space-defining step of defining an internal space which is partially surrounded by an arm or electrodes of said end effector;
    an extracting step of extracting a portion of a workpiece to be welded existing in said internal space as an objective workpiece portion of said workpiece; and
    an interference-investigating step of investigating whether interference occurs between said end effector and said objective workpiece portion when said articulated robot is operated.

2. The method for setting said operation path for said articulated robot according to claim 1, wherein said workpiece is a model which is approximated with a plurality of blocks.

3. The method for setting said operation path for said articulated robot according to claim 1, wherein said internal space is a model which is approximated with a plurality of blocks.

4. The method for setting said operation path for said articulated robot according to claim 1, wherein said interference-investigating step comprises:
    a reference line-defining step of defining a reference line passing through a center of said objective workpiece portion;
    an investigation end position-defining step of setting an investigation end position for said end effector on said reference line; and
    a first detailed interference-investigating step of investigating whether interference occurs between said end effector and said objective workpiece portion by operating said end effector from an investigation start position to said investigation end position.

5. The method for setting said operation path for said articulated robot according to claim 1, wherein said interference-investigating step comprises:
    a reference line-defining step of defining a reference line passing through a center of said objective workpiece portion;
    a center of gravity position-defining step of defining a center of gravity position of said objective workpiece portion based on said reference line; and
    a second detailed interference-investigating step of investigating whether interference occurs between said end effector and said objective workpiece portion by operating said end effector from an investigation start position to said center of gravity position.

6. The method for setting said operation path for said articulated robot according to claim 5, wherein a portion of said objective workpiece portion, which is located near an opening as compared with said center of gravity position of said objective workpiece portion, is extracted as a new objective workpiece portion to perform said center of gravity position-defining step and said second detailed interference-investigating step, said objective workpiece portion being replaced with said new objective workpiece portion.

7. An apparatus for setting an operation path for an articulated robot including an end effector, said apparatus comprising:
    an internal space-defining section for defining an internal space which is partially surrounded by an arm or electrodes of said end effector;

a workpiece-extracting section for extracting a portion of a workpiece to be welded existing in said internal space as an objective workpiece portion of said workpiece; and an interference-investigating section for investigating whether interference occurs between said end effector and said objective workpiece portion when said end effector is operated.

8. A method for setting an operation path for an articulated robot for operating an end effector from a start point to an arrival point, said method comprising:

an operation-investigating step of setting a path for connecting said start point and said arrival point to investigate whether said end effector can be operated along said path; and a retracting path-setting step of setting a retracting path for operating said end effector by a prescribed distance in a prescribed direction from said start point or said arrival point if said end effector cannot be operated along said path in said operation-investigating step.

9. The method for setting said operation path for said articulated robot according to claim 8, wherein said prescribed direction is predetermined based on a posture of said end effector at said start point or said arrival point.

10. The method for setting said operation path for said articulated robot according to claim 8, wherein said prescribed direction is a direction to connect said start point or said arrival point and an established point in space.

11. The method for setting said operation path for said articulated robot according to claim 10, wherein said established point is a central point of an original axis of said articulated robot.

12. The method for setting said operation path for said articulated robot according to claim 8, wherein an end point of said retracting path is defined as a new start point or a new arrival point to execute said operation-investigating step or said retracting path-setting step again.

13. The method for setting said operation path for said articulated robot according to claim 8, wherein said retracting path is set, again if an end point of said retracting path is a point at which said articulated robot cannot arrive or at which interference occurs, said prescribed distance being corrected in said retracting path.

14. An apparatus for setting an operation path for an articulated robot for operating an end effector from a start point to an arrival point, said apparatus comprising:

a path-investigating section for setting a path for connecting said start point and said arrival point to investigate whether said end effector can be operated along said path; and a wide-area operation path-setting section for setting a retracting path for operating said end effector by a prescribed distance in a prescribed direction from said start point or said arrival point if said path-investigating section judges that said end effector cannot be operated along said path.

15. A method for setting an operation path for an articulated robot for operating an end effector between operation points for a workpiece, said method comprising:

a narrow-area operation path-setting step of setting a narrow-area operation path for retracting said end effector from said operation point to a point located near an end of said workpiece without interfering in said workpiece and another obstacle based on shapes of said obstacle and said workpiece near said operation point, said end effector being arranged at said operation point for said workpiece;

said narrow-area operation path-setting step comprising:

an internal space-defining step of defining an internal space which is partially surrounded by an arm or electrodes of said end effector; and an extracting step of extracting a portion of said workpiece to be welded existing in an internal space as an objective workpiece portion of said workpiece;

an interference-investigating step of investigating whether interference occurs between said end effector and said objective workpiece portion when said articulated robot is operated, and a wide-area operation path-setting step of setting a wide-area operation path for effecting operation from a start point to an arrival point by combining predetermined prescribed operations provided that said start point and said arrival point reside in predetermined points located near said end of said workpiece.

16. The method for setting said operation path for said articulated robot according to claim 15, wherein said wide-area operation path-setting step comprises:

an operation-investigating step of setting a path for connecting said start point and said arrival point to investigate whether said end effector can be operated along said path; and a retracting path-setting step of setting a retracting path for operating said end effector by a prescribed distance in a prescribed direction from said start point or said arrival point if said end effector cannot be operated along said path in said operation-investigating step.

17. The method for setting said operation path for said articulated robot according to claim 16, wherein said prescribed direction is predetermined based on a posture of said end effector at said start point or said arrival point.

18. The method for setting said operation path for said articulated robot according to claim 16, wherein said prescribed direction is a direction to connect said start point or said arrival point and an established point in space.

19. An apparatus for setting an operation path for an articulated robot for operating an end effector between operation points for a workpiece, said apparatus comprising:

a narrow-area operation path-setting section for setting a narrow-area operation path for retracting said end effector from said operation point to a point located near an end of said workpiece without interfering in said workpiece and another obstacle based upon shapes of said obstacle and said workpiece near said operation point, said end effector being arranged at said operation point for said workpiece;

said narrow-area operation path-setting comprising:

an internal space-defining for defining an internal space which is partially surrounded by an arm or electrodes of said end effector;

a workpiece-extracting section for extracting a portion of said workpiece to be welded existing in said internal space as an objective workpiece portion of said workpiece; and an interference-investigating section for investigating whether interference occurs between said end effector and said objective workpiece portion when said articulated robot is operated, and a wide-area operation path-setting section for setting a wide-area operation path for effecting operation from a start point to an arrival point by combining predetermined prescribed operations provided that said start point and said arrival point reside in predetermined points located near said end of said workpiece.

* * * * *